United States Patent
Shimosato

(10) Patent No.: US 10,674,020 B2
(45) Date of Patent: Jun. 2, 2020

(54) INFORMATION PROCESSING DEVICE CONFIGURED FOR A SEARCH PROCESS, AND CONTROL METHOD OF AN INFORMATION PROCESSING DEVICE CONFIGURED FOR A SEARCH PROCESS

(71) Applicant: SEIKO EPSON CORPORATION, Tokyo (JP)

(72) Inventor: Ryota Shimosato, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/144,371

(22) Filed: Sep. 27, 2018

(65) Prior Publication Data

US 2019/0104220 A1 Apr. 4, 2019

(30) Foreign Application Priority Data

Sep. 29, 2017 (JP) .................................. 2017-190220

(51) Int. Cl.
*H04N 1/00* (2006.01)
*G07G 5/00* (2006.01)
(Continued)

(52) U.S. Cl.
CPC ....... *H04N 1/00087* (2013.01); *G06F 3/1203* (2013.01); *G06F 3/1206* (2013.01);
(Continued)

(58) Field of Classification Search
None
See application file for complete search history.

(56) References Cited

U.S. PATENT DOCUMENTS

| 2004/0083134 A1* | 4/2004 | Spero ................. G06Q 20/20 705/16 |
| 2006/0170944 A1* | 8/2006 | Arps .................. G06F 3/1206 358/1.13 |

(Continued)

FOREIGN PATENT DOCUMENTS

| JP | 2018-018464 A | 2/2018 |
| JP | 2018-018465 A | 2/2018 |

(Continued)

OTHER PUBLICATIONS

Extended European Search Report dated Jan. 9, 2019 in related European Appl. 18197528.5 (8 pgs.).

*Primary Examiner* — Miya J Williams
(74) *Attorney, Agent, or Firm* — Foley & Lardner LLP

(57) ABSTRACT

A user of a control server 15 can be made aware of the need for a rule change. A control server 15 has an acquisition unit 401 that acquires printed text data containing the object values of multiple objects printed on roll paper according to a specific layout as text data corresponding to the specific layout; an analyzer 402 that executes a search process on the printed text data acquired by the acquisition unit 401 to find the object value of an object targeted by the search based on an analytical rule set that is set relationally to object of the search target; a detector 403 that detects change in the analytical rule set defined for the analyzer 402; and at least one of a control server display 43 or control server network communicator 41 that reports change in the analytical rule set.

12 Claims, 19 Drawing Sheets

(51) Int. Cl.
  *G06Q 20/40* (2012.01)
  *G06F 3/12* (2006.01)
  *G06Q 20/20* (2012.01)
  *G06Q 20/04* (2012.01)
  *G07G 1/00* (2006.01)

(52) U.S. Cl.
  CPC ............ *G06F 3/129* (2013.01); *G06F 3/1237* (2013.01); *G06F 3/1273* (2013.01); *G06Q 20/045* (2013.01); *G06Q 20/209* (2013.01); *G06Q 20/405* (2013.01); *G07G 1/0036* (2013.01); *G07G 5/00* (2013.01); *H04N 1/00037* (2013.01); *G06F 3/1208* (2013.01); *G06F 3/1209* (2013.01)

(56) References Cited

U.S. PATENT DOCUMENTS

| | | | |
|---|---|---|---|
| 2007/0041041 A1 | 2/2007 | Engbrocks et al. | |
| 2010/0202003 A1* | 8/2010 | Parkhurst | G06F 3/1208 358/1.9 |
| 2016/0196095 A1 | 7/2016 | Nishizawa | |
| 2016/0232630 A1* | 8/2016 | Admon | G06Q 50/18 |
| 2017/0070640 A1* | 3/2017 | Kondoh | G06F 3/1208 |
| 2018/0032483 A1 | 2/2018 | Omiya et al. | |

FOREIGN PATENT DOCUMENTS

| | | |
|---|---|---|
| JP | 2018-018466 A | 2/2018 |
| WO | WO-2014/103251 A1 | 7/2014 |

\* cited by examiner

INFORMATION PROCESSING DEVICE CONFIGURED FOR A SEARCH PROCESS, AND CONTROL METHOD OF AN INFORMATION PROCESSING DEVICE CONFIGURED FOR A SEARCH PROCESS

BACKGROUND

1. Technical Field

The present invention relates to an information processing device, and a control method of an information processing device.

2. Related Art

Systems that include a POS terminal, a printer, and an information processing device, with the information processing device configured to analyze, based on predetermined rules, information printed on a print medium are known from the literature. See, for example, International Publication No. WO2014/103251.

However, the system described in International Publication No. WO2014/103251 may be changed as a result of replacing a POS terminal or printer, for example. When the system is modified in this way, the information processing device may become unable to interpret the information printed on the print medium using the rules that were used before the system changed. This creates a need to make the user of the information processing device or the provider of the analytical service aware of the need to change the rules.

SUMMARY

The present invention is directed to solving the foregoing problem, and an object of the invention is to make a user of the information processing device aware of the need to change the rules.

To achieve the foregoing objective, an information processing device according to the invention includes an acquisition unit configured to acquire target data containing, as text data corresponding to a specific layout, the object values of multiple objects printed on a print medium according to the specific layout; a controller that executes a search process according to rules set relationally to the search target objects to find the object values of the search target objects in the target data acquired by the acquisition unit; a detector that detects change in the rule set for the controller; and a means of reporting a change in the rule.

This configuration detects and reports a change in the rule applied to find an object value, and can thereby make the user of the information processing device aware of the need to change the rule.

In an information processing device according to another aspect of the invention, the detector detects change in the rule by detecting a feature of the target data acquired by the acquisition unit, and comparing the detected feature with a feature of the text data acquired by the acquisition unit before the target data from which the feature was detected.

By comparing a feature of target data acquired during a specific period with a feature of text data acquired before that specific period, this aspect of the invention can accurately detect a rule change.

In an information processing device according to another aspect of the invention, the detector detects a rule change when there is a change in the location of the object or the location of the object value in the target data.

By detecting a rule change when there is a change in the location of an object or the location of an object value in the target data, this aspect of the invention can accurately detect a rule change.

In an information processing device according to another aspect of the invention, for at least some of multiple objects included in the target data, the detector detects a change in a rule set relationally to the object.

By detecting change in rules set relationally to at least some of multiple objects in the target data, this aspect of the invention can accurately detect a rule change even when part of the layout has changed.

In another aspect of the invention, the controller, by searching for an object value contained in the target data, executes the search process to include at least one of determining the type of the target data and tabulating or analyzing the object value of each object; and the detector detects change in the rule based on the rate of success, or change in the rate of success, of the controller in the search process.

By detecting change in rules based on the rate of success, or change in the rate of success, of the controller in the search process, this aspect of the invention can accurately detect a rule change.

An information processing device according to another aspect of the invention preferably also has storage for storing a history of the results of search processes executed by the controller, and the detector detects change in the rule based on the history stored in the storage.

By detecting a rule change based on history information indicating the results of search processes executed by the controller, this aspect of the invention can accurately detect a rule change.

In an information processing device according to another aspect of the invention, the acquisition unit acquires target data by identifying the device that output the target data; the controller executes a search process to find the object value of a search target object according to a rule set relationally to the device that output the target data and the search target object; and the detector detects change in the rule set relationally to the device that output the target data to which the search process is applied.

By detecting a rule change set for a particular device, this aspect of the invention can accurately detect change in rules for individual devices.

In another aspect of the invention, when device identification information identifying a device is added to the target data acquired by the acquisition unit, the detector detects change in a rule based on change in the device identification information added to the target data.

By detecting change in a rule based on change in the device identification information added to the target data, this aspect of the invention can accurately detect change in a rule when the device that output the target data changes.

Another aspect of the invention is a control method of an information processing device according to the invention includes acquiring target data containing, as text data corresponding to a specific layout, the object values of multiple objects printed on a print medium according to the specific layout; executing a search process according to rules set relationally to the search target objects to find the object values of the search target objects in the target data acquired by the acquisition unit; detecting change in the rule applied to the object of the search target in the search process; and reporting change in the rule.

This configuration detects and reports a change in the rule applied to find an object value, and can thereby make the user of the information processing device aware of the need to change the rule.

Other objects and attainments together with a fuller understanding of the invention will become apparent and appreciated by referring to the following description and claims taken in conjunction with the accompanying drawings.

DESCRIPTION OF EMBODIMENTS

Figure 1:
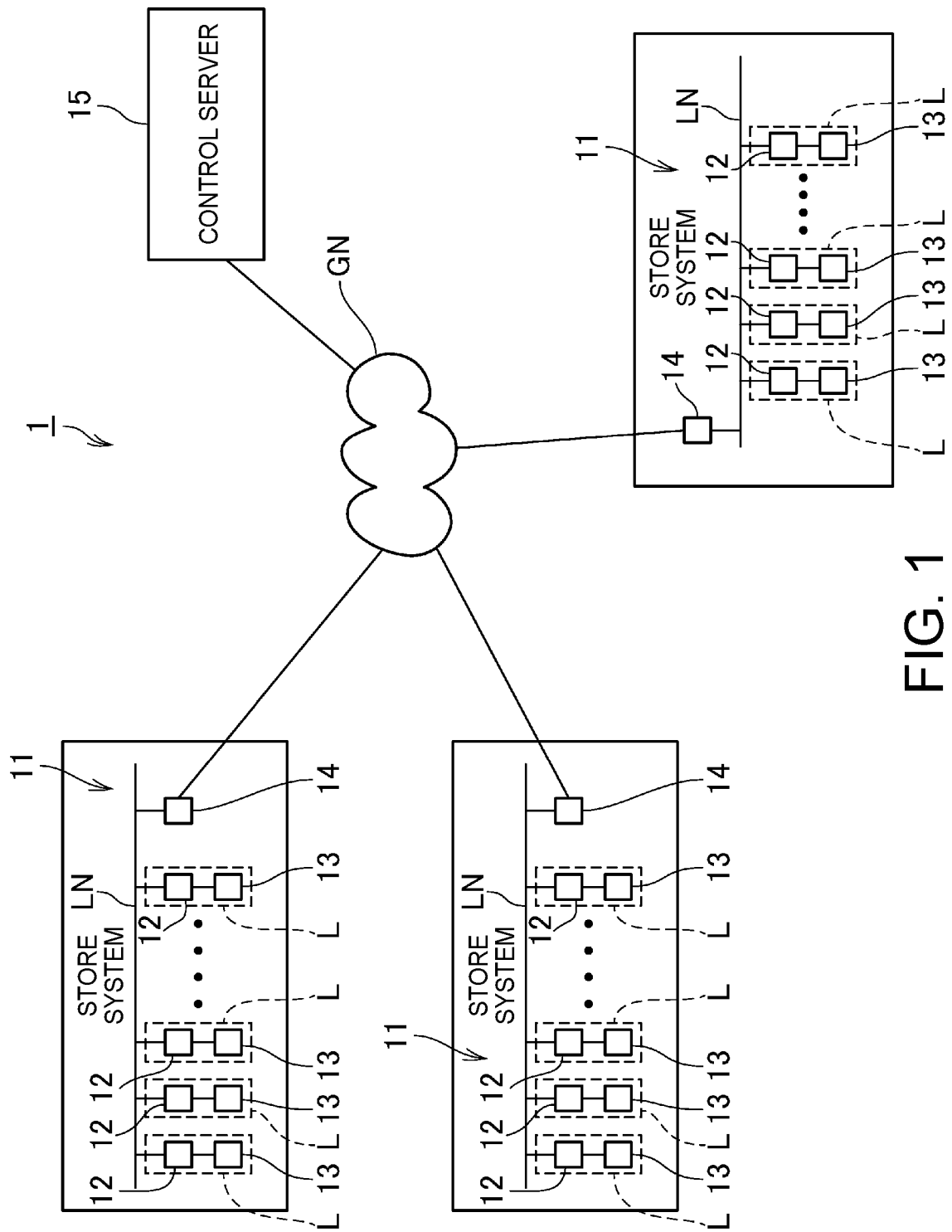
FIG. 1 illustrates the configuration of an information processing system according to the invention.

FIG. 1 illustrates the configuration of an information processing system 1 according to a preferred embodiment of the invention.

As shown in FIG. 1, the information processing system 1 includes a plurality of store systems 11. A store system 11 is a system that is used in retail businesses such as supermarkets, convenience stores, department stores, and restaurants. The business may be any facility in which a product is provided and a customer transaction is performed according to the provision of the product. In this embodiment, the product is not limited to a physical product supplied to the customer, and means any product that is provided to a customer in exchange for payment, including services provided to customers and food or drink provided to customers.

The store system 11 has functions for processing transactions according to the products purchased by customers, and producing receipts based on the transactions.

A checkout counter L where customer transactions are processed is located in the business where the store system 11 is deployed. A printer 12 capable of recording on roll paper (print media) is installed at the checkout counter L. A POS terminal 13 (device) that connects to and communicates wirelessly with the printer 12 and controls the printer 12 is also disposed at the checkout counter L.

During a transaction at the checkout counter L, the cash register operator reads barcodes from the products or product packaging using a barcode reader BR connected to the printer 12, and inputs information related to the transaction to the POS terminal 13. The printer 12 sends data based on reading with the barcode reader BR to the POS terminal 13. Based on the data acquired by reading with the barcode reader BR and received from the printer 12, and transaction-related input from the operator, the POS terminal 13 controls the printer 12 to produce a receipt. The receipt produced by the printer 12 is then given by the operator to the customer.

The configuration, functions, and processes based on the functions of the printer 12 and POS terminal 13 are described further below.

A local area network LN is deployed in the store system 11.

The printer 12 connects to the local area network LN.

A communication device 14 is also connected to the local area network LN. The communication device 14 is an interface device that connects to the local area network LN and a global network GN including the Internet, telephone network, and other communication networks.

The communication device 14 has the functions of a modem (or ONU (Optical Network Unit)), a router, a NAT (Network Address Translation) device, and a DHCP (Dynamic Host Configuration Protocol) server. The communication device 14 transfers data that is sent and received between devices when a device connected to the local area network LN and a device connected to the global network GN communicate with each other. Note that the communication device 14 is represented by a single block in FIG. 1, but the communication device 14 may comprise plural devices with different functions.

The printer 12 can also access the global network GN through the communication device 14.

A control server 15 (information processing device) is connected to the global network GN.

The control server 15 is a server that communicates with the printer 12. More specifically, when triggered by a request from a client, for example, the control server 15 runs a specific process. The control server 15 sends data based on the result of the process to the client as needed.

Note that the control server 15 is represented by a single block in FIG. 1, but this does not mean that the control server 15 is embodied by a single server device. For example, the control server 15 may comprise a plurality of server devices. More specifically, the control server 15 may be configured in any way enabling executing the processes described below.

Figure 2:
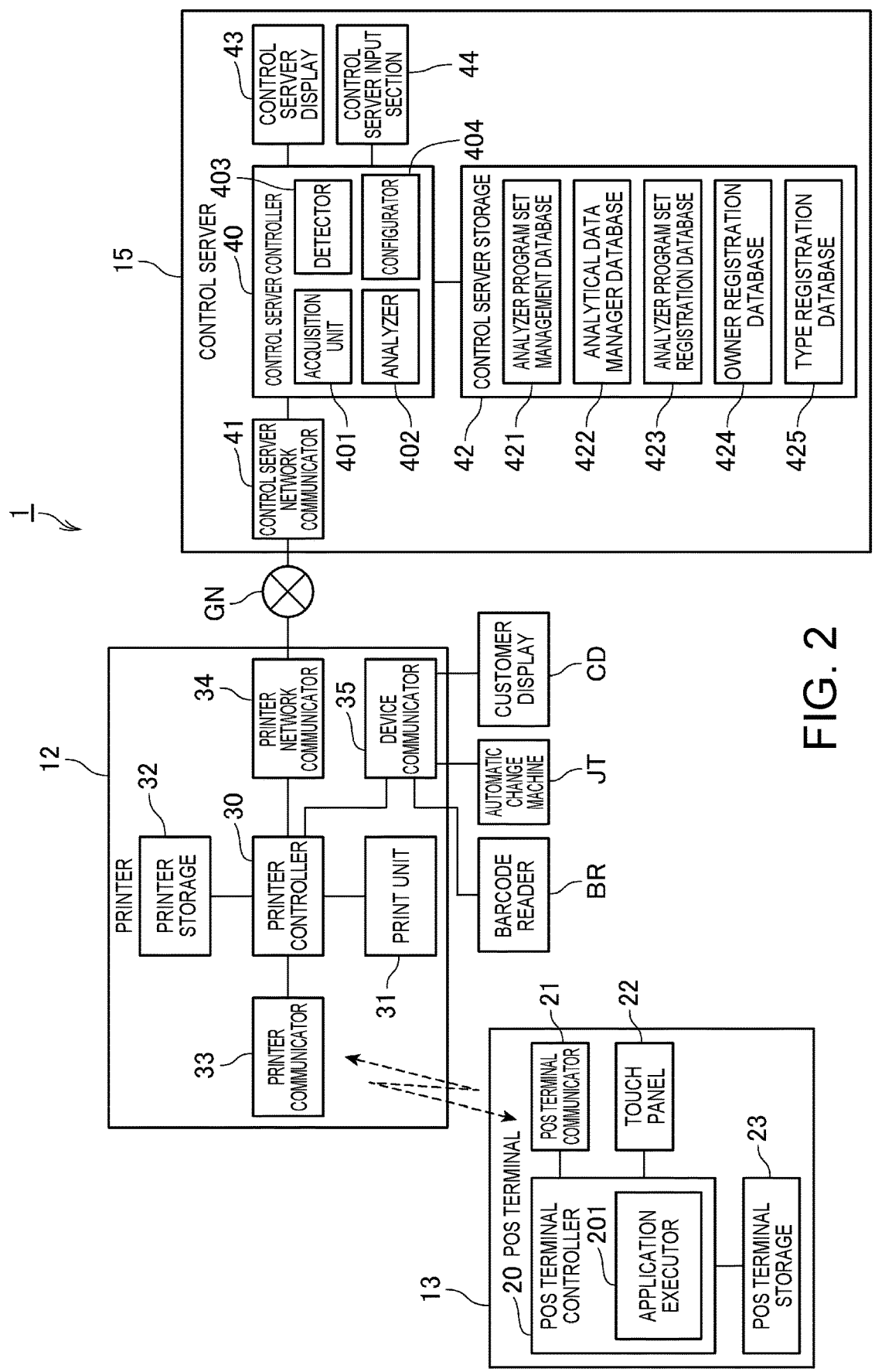
FIG. 2 is a block diagram illustrating the functional configuration of devices in the information processing system.

FIG. 2 is a block diagram illustrating the functional configuration of devices in the information processing system 1.

The POS terminal 13 is, for example, a tablet (slate) computer with a touch panel 22 covering a large area on the front. Note that the POS terminal 13 may be a desktop computer or other type of stationary terminal.

When a transaction is processed at the checkout counter L, the POS terminal 13 functions as a host computer that runs transaction-related processes and controls the printer 12.

As shown in FIG. 2, the POS terminal 13 includes a POS terminal controller 20, a POS terminal communicator 21, a touch panel 22, and POS terminal storage 23.

The POS terminal controller 20 comprises a CPU, ROM, RAM, ASIC, and other signal processing circuits not shown, and controls other parts of the POS terminal 13. The POS terminal controller 20 executes processes by the cooperation of hardware and software, such as a CPU reading a program stored in ROM to RAM and running the program from RAM, or by functions of the ASIC, or by a signal processing circuit executing processes by processing signals. A specific application is preinstalled to the POS terminal 13. The POS terminal controller 20 functions as an application executor 201 by reading and running the specific application, programs (such as the OS, APIs, plugins) associated with the specific application, or other programs.

The POS terminal communicator 21 communicates with the printer 12 according to a specific communication protocol as controlled by the POS terminal controller 20. The POS terminal communicator 21 in this embodiment communicates with the printer 12 according to a specific wireless communication protocol. The wireless communication protocol for wireless communication between the POS terminal 13 and printer 12 may be a wireless LAN standard compatible with an ad hoc mode, a wireless LAN standard compatible with an infrastructure mode, or a near-field communication standard such as Bluetooth®, for example. Note that the POS terminal communicator 21 may also communicate with the printer 12 according to a specific wired communication protocol.

The touch panel 22 combines an LCD panel or other type of display panel, and a touch sensor overlaid to or integrated with the display panel. The display panel displays images as controlled by the POS terminal controller 20. The touch sensor detects touch operations by the user and outputs to the POS terminal controller 20. The POS terminal controller 20 then executes processes appropriate to the touch operation based on input from the touch sensor.

The POS terminal storage 23 has nonvolatile memory, and stores data. The POS terminal storage 23 stores POS identification information J16 (device identification information) identifying the POS terminal.

The printer 12 is a thermal printer that holds roll paper and forms dots on the stored roll paper with a line thermal head to print images.

The printing method of the printer 12 in this embodiment is thermal, but the printing method of the printer 12 is not limited to thermal printing, and may be inkjet or other method. The printhead of the printer 12 is also not limited to a line head, and may be a serial printhead.

As shown in FIG. 2, the printer 12 has a printer controller 30, print unit 31, printer storage 32, printer communicator 33, printer network communicator 34, and device communicator 35.

The printer controller 30 comprises a CPU, ROM, RAM, ASIC, and other signal processing circuits not shown, and controls other parts of the printer 12. The printer controller 30 executes processes by the cooperation of hardware and software, such as a CPU reading a program stored in ROM to RAM and running the program from RAM, or by functions of the ASIC, or by a signal processing circuit executing processes by processing signals.

The print unit 31 includes mechanisms related to printing on roll paper, such as a conveyance mechanism for conveying roll paper stored inside the cabinet of the printer 12, a printing mechanism for forming dots and printing images on the roll paper with a thermal head, and a cutter mechanism for cutting the roll paper at a specific position. As controlled by the printer controller 30, the print unit 31 conveys the roll paper with the conveyance mechanism, prints receipt-related images on the roll paper by the printing mechanism while, and then cuts the roll paper at a specific position with the cutter mechanism, producing a receipt.

The printer storage 32 has nonvolatile memory, and stores data.

Note that the printer storage 32 may store the POS identification information J16 of the POS terminal 13 the printer 12 communicates with through the printer communicator 33. In this case, the printer controller 30, by a specific method, acquires the POS identification information J16 from the POS terminal 13 through the printer communicator 33, and stores the POS identification information J16 in the printer storage 32.

The printer communicator 33 communicates with the POS terminal 13 according to a specific communication protocol as controlled by the printer controller 30.

In this embodiment, the printer communicator 33 communicates with the POS terminal 13 through a specific wireless communication protocol.

Any desired wireless communication standard may be used for communication between the POS terminal 13 and printer 12, including ad hoc mode wireless LAN standards, infrastructure mode wireless LAN standards, Bluetooth, or other near-field communication standard. Note that the printer communicator 33 may also communicate with the POS terminal 13 using a specific wired communication protocol.

The printer network communicator 34 communicates with devices connected to the global network GN (including the control server 15) according to a specific communication protocol as controlled by the printer controller 30. The communication standard used for communication by the printer network communicator 34 may be HTTP, Web Socket, or other standard.

The device communicator 35 includes an interface board with ports such as a USB port, a serial communication port (such as RS-232C) other than a USB port, a port compatible with a parallel communication standard (such as IEEE 1284), a wired LAN standard port (such as Ethernet®), or other type of port. A device can connect to each port. The device communicator 35 communicates with the devices connected to the printer 12 through the ports as controlled by the printer controller 30.

Note that the device communicator 35 may be configured with a wireless communication capability for communicating wirelessly with devices.

A barcode reader BR, customer display CD, and an automatic change machine JT are examples of devices that connect to the POS terminal 13 in this example.

The barcode reader BR is used to read barcodes from products and product packaging, and outputs the read result to the device communicator 35. The device communicator 35 outputs the data input from the barcode reader BR to the printer controller 30.

The customer display CD displays transaction-related information as controlled by the printer controller 30. The information presented on the customer display CD can be checked by the customer involved in the transaction at the checkout counter L.

The automatic change machine JT has cash receiver openings for receiving cash inserted by the customer and cash dispenser openings for dispensing change according to the amount received, and when cash is input through the cash receiver, the change due is dispensed from the cash return openings as controlled by the printer controller 30.

As shown in FIG. 2, the control server 15 includes a control server controller 40, control server network communicator 41, control server storage 42 (storage device) (rule storage), control server display 43, and control server input section 44.

The control server controller 40 comprises a CPU, ROM, RAM, ASIC, and other signal processing circuits not shown, and controls other parts of the control server 15. The control server controller 40 executes processes by the cooperation of hardware and software, such as a CPU reading a program stored in ROM to RAM and running the program from RAM, or by functions of the ASIC, or by a signal processing circuit executing processes by processing signals.

Function blocks of the control server controller 40 include an acquisition unit 401, analyzer 402 (control unit), detector 403, and configurator 404. These function blocks execute processes by the cooperation of hardware and software, such as a CPU or other hardware reading a program stored in the control server storage 42 or ROM, and executing processes. These function blocks are described below.

The control server network communicator 41 communicates with devices connected to the global network GN (including printers 12) according to a specific communication protocol as controlled by the control server controller 40. The communication standard used for communication by the control server network communicator 41 may be HTTP, Web Socket, or other standard. The control server network communicator 41 functions as a reporting unit that sends information to devices connected to the global network GN and reports information to the owner (user) of the device.

The control server storage 42 has nonvolatile memory and stores data. More specifically, the control server storage 42 stores an analyzer program set management database 421, analytical data manager database 422, analyzer program set registration database 423, owner registration database 424, and type registration database 425. These databases are described further below.

The control server display 43 includes a display panel, and displays information on the display panel as controlled by the control server controller 40. When reporting information by displaying information, the control server display 43 functions as a reporting unit.

The control server input section 44 includes a keyboard, mouse, or other type of input device, detects input to the input devices, and outputs to the control server controller 40. Based on input from the control server input section 44, the control server controller 40 runs processes based on the input to the input device.

Operation of the POS terminal 13, printer 12, and control server 15 when a customer transaction is processed at the checkout counter L is described next.

Figure 3:
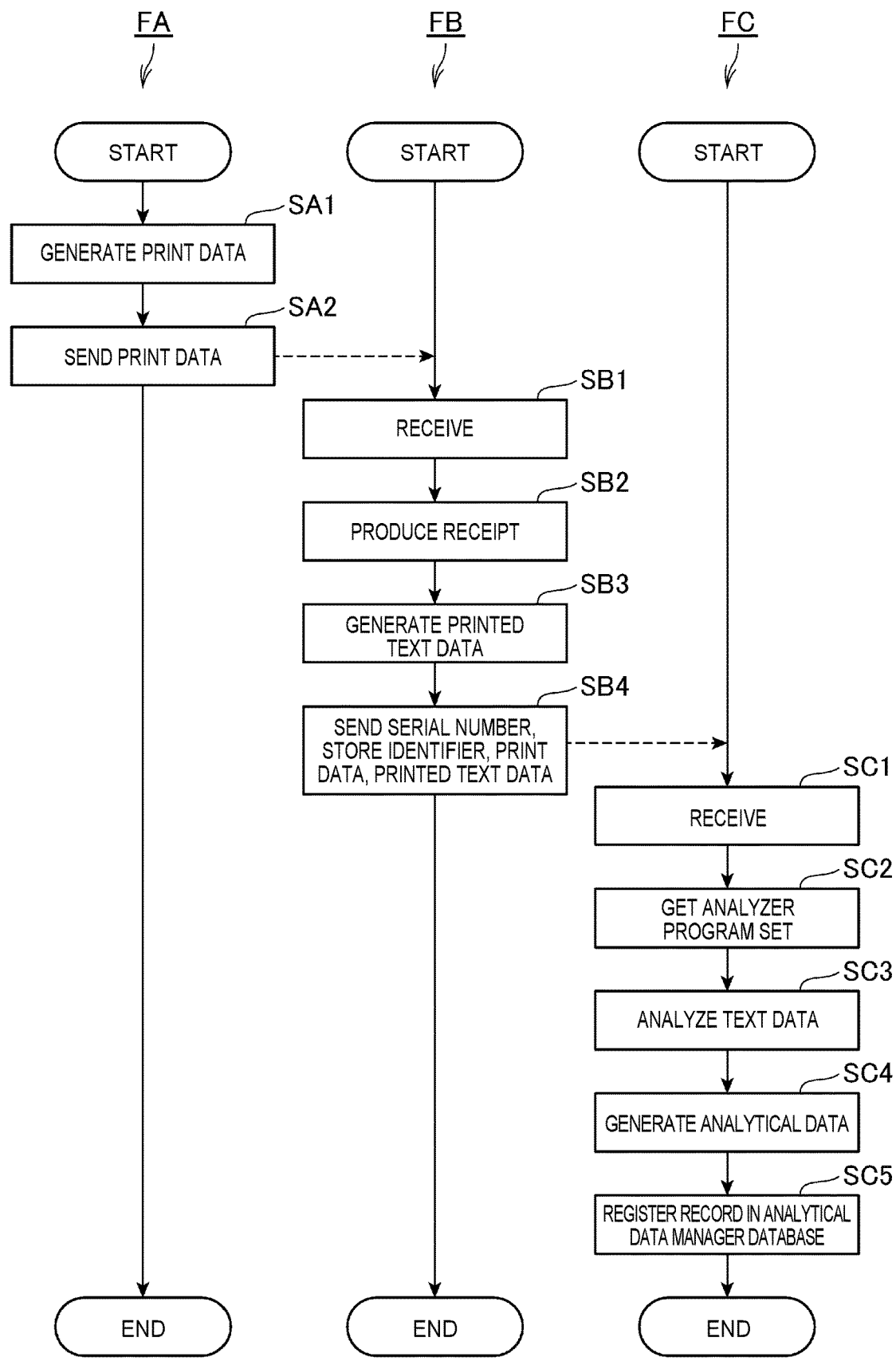
FIG. 3 is a flow chart of the operation of a POS terminal, printer, and control server.

FIG. 3 is a flow chart of the operation of the POS terminal 13, printer 12, and control server 15 when processing a transaction at the checkout counter L. Column FA describes the process of the POS terminal 13, column FB describes the process of the printer 12, and column FC describes the process of the control server 15.

FIG. 3 is described below through the acquisition unit 401 and analyzer 402 provided as function blocks of the control server controller 40.

As shown in column FA of FIG. 3, the application executor 201 of the POS terminal controller 20 of the POS terminal 13 executes a transaction process appropriately to the customer transaction, and generates print data based on the transaction process (step SA1).

More specifically, in step SA1, the application executor 201 displays a user interface enabling transaction input on the touch panel 22. The application executor 201 generates receipt information according to the operator input to the touch panel 22 and input from the printer 12 in conjunction with the customer transaction. The receipt information is information printed on the receipt produced by the printer 12. The specific content of the receipt information is described below using examples.

Next, the application executor 201 generates print data based on the generated receipt information. The print data is data instructing producing a receipt with the receipt information printed in a specific layout. The print data includes plural control commands in the command language of the printer 12.

Figure 4:
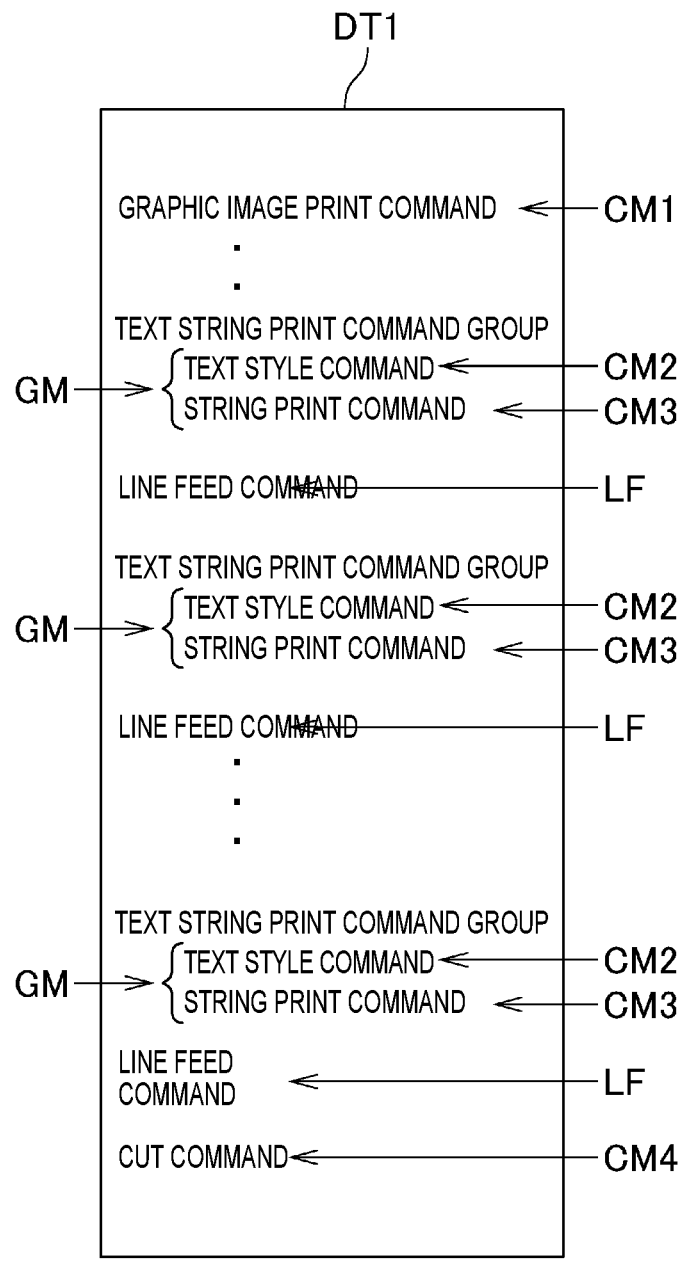
FIG. 4 shows an example of print data.

FIG. 4 shows print data DT1 as an example of print data.

As shown in the print data DT1 in FIG. 4, the print data DT may include a graphic image print command CM1, text string print command group GM, line feed command LF, and cut command CM4. The text string print command group GM includes a text style command CM2, and string print command CM3.

The graphic image print command CM1 is a control command including a specific command code and bit-mapped or other type of image data, and instructs printing a graphic image based on the image data.

The image data is data storing information related to the color of each dot in a dot matrix arrangement.

A graphic image is an image printed based on image data received from a device functioning as a host computer (the POS terminal 13 in this example), and is not an image printed based on font data. The logo information J1 described below is an example of a graphic image.

The string print command CM3 contained in the text string print command group GM is a control command instructing printing one line of text. The string print command CM3 includes a specific command code and information indicating the text string to print (a combination of one or more character codes comprising the string).

The text style command CM2 contained in the text string print command group GM is a control command specifying the styles to apply to the string to be printed by the string print command CM3. Styles that may be applied to the string may include right alignment, center alignment, left alignment, bold, underlining, adding emphasis marks, black/white inversion, rotation, enlargement, and reduction.

The printer storage 32 of the printer 12 stores font data for each printable character. The printer controller 30 of the printer 12 executes the following process to print a string based on one text string print command group GM.

The printer controller 30 converts, by a specific means, each character code contained in the string print command CM3 in the one text string print command group GM to the corresponding font data. Next, the printer controller 30 applies any styling specified by the text style command CM2 in the same text string print command group GM to the font data for each character, and renders the font data in an image buffer. Next, the printer controller 30 controls the print unit 31 based on the font data rendered in the image buffer to print the string for one line.

The line feed command LF is a command specifying a line feed (new line) command. The cut command CM4 is a command specifying cutting the roll paper.

As shown in column FA in FIG. 3, after generating the print data in step SA1, the application executor 201 controls the POS terminal communicator 21 to send the generated print data to the printer 12 (step SA2).

As shown in column FB in FIG. 3, the printer controller 30 of the printer 12 controls the printer communicator 33 to receive the print data (step SB1).

Next, the printer controller 30 controls the print unit 31 to produce a receipt based on the print data received in step SB1 (step SB2). The resulting receipt is given to the customer.

Figure 5B:
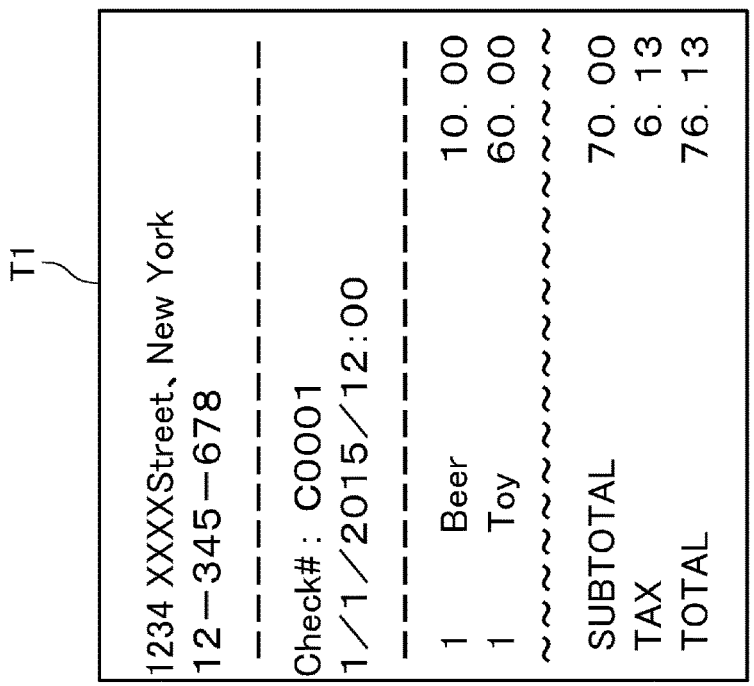
FIG. 5B shows an example of printed text data.
Figure 5A:
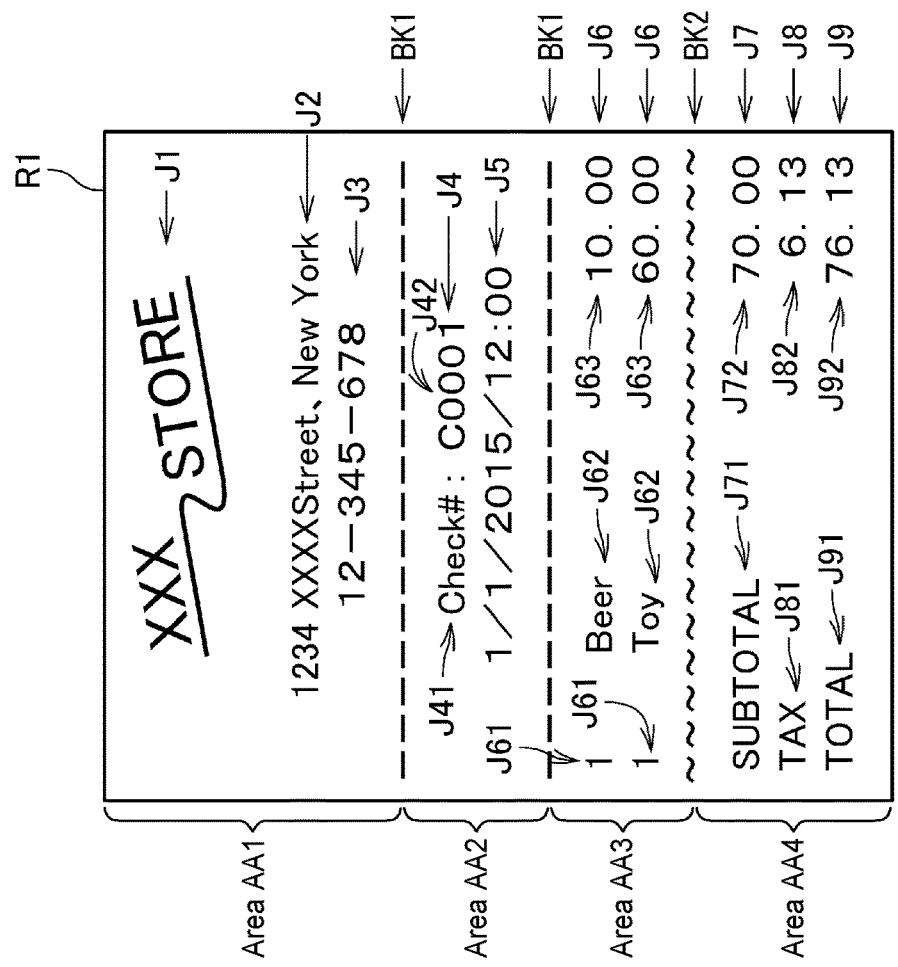
FIG. 5A shows an example of a receipt.

A receipt with a layout such as shown in FIG. 5A is an example of a receipt produced by the printer 12 based on the print data.

FIG. 5A shows an example of a receipt produced by the printer 12 based on print data.

Note that the object to which a character code is assigned in this example is referred to herein as a "character." Characters include symbols to which a character code is assigned, and space characters to which a character code is assigned.

Logo information J1 as a graphical representation of the name of the store is printed at the top of the receipt R1 in FIG. 5A. The logo information J1 is printed based on the graphic image print command CM1 described above.

Store address information J2 expressing the address of the store with a text string is recorded below the logo information J1 on the receipt R1. The store address information J2 is printed based on a text string print command group GM including a text style command CM2 specifying a center alignment style, and a string print command CM3 instructing printing a string expressing the store address.

Telephone number information J3, which is a text string representing the telephone number of the store, is printed on the line below the store address information J2. The telephone number information J3 is printed based on a text string print command group GM including a text style command CM2 specifying a center alignment style, and a string print command CM3 instructing printing a string expressing the telephone number of the business.

On the line following the telephone number information J3 in the receipt R1 is printed first area break information BK1. The first area break information BK1 is a string of multiple hyphens (-) on the same line.

The print area of the receipt R1 is divided by the first area break information BK1, and the first area break information BK1 separates the area thereabove from the following content. Below, the area above the first area break information BK1 in receipt R1 is referred to as area AA1.

On the line following the first area break information BK1 on the receipt R1 is printed receipt identification related information J4. The receipt identification related information J4 contains a receipt identifier J42, which is a text string identifying the receipt. The value of the receipt identifier J42 is different on every receipt. The receipt identification related information J4 contains a receipt identification identifier J41, which is printed at the left side on the same line as the receipt identifier J42, and which is information indicating that the receipt identifier J42 is information identifying the receipt. In the example in FIG. 5A, the receipt identification identifier J41 of the receipt R1 is the string Check #.

The receipt identification related information J4 is printed based on a text string print command group GM including a text style command CM2 specifying a center alignment style, and the string print command CM3 described below. This string print command CM3 is a control command instructing printing the string expressing the receipt identification identifier J41, one space character, and a string expressing the receipt identifier J42.

On the line following the receipt identification related information J4 in the receipt R1 is printed a time stamp J5, which is a text string expressing the date and time the receipt was printed. The time stamp J5 is printed based on a text string print command group GM including a text style command CM2 specifying a center alignment style, and a string print command CM3 instructing printing a string expressing the date and time the receipt was printed.

First area break information BK1 is then printed below the time stamp J5.

The print area of the receipt R1 is segmented by the first instance of first area break information BK1 and the second instance of first area break information BK1, and the two instances of first area break information BK1 define a specific print area. The area of the receipt R1 between the first and second instances of the first area break information BK1 is referred to below as area AA2.

Starting from the line following the second instance of first area break information BK1 in the receipt R1 is printed one or more lines of product information J6 (two lines shown in the example in FIG. 5A). The product information J6 is printed on the receipt R1 for each type of product purchased by the customer. Therefore, if the customer purchased three different products, three lines of product information J6 are printed, one for each product type. When multiple lines of product information J6 are printed on a receipt R1, the multiple lines of product information J6 are consecutively printed to different lines.

The product information J6 includes purchased quantity information J61, product name information J62, and price information J63. The purchased quantity information J61, product name information J62, and price information J63 are printed on the same line. The purchased quantity information J61 is a text string expressing the quantity (count) of the product purchased. The product name information J62 is a text string expressing the name of the corresponding product. The price information J63 is a text string expressing the price of the corresponding product.

The purchased quantity information J61, product name information J62, price information J63 are printed in this order on one line of the receipt R1 from left to right.

The product information J6 is printed based on a text string print command group GM including a text style command CM2 specifying a left alignment style, and the following string print command CM3.

This string print command CM3 is a control command instructing consecutively printing a string expressing the purchased quantity information J61, a white space character, a string expressing the product name information J62, one or more white space characters, and a string expressing the price information J63. The number of white space characters inserted between the product name information J62 string and the price information J63 string is adjusted so that the price information J63 is printed at the end of the line.

On the line following the last line of printed product information J6 on the receipt R1 is second area break information BK2. The second area break information BK2 in this example is a string of multiple tilde (~) characters printed consecutively on one line.

The print area of the receipt R1 is segmented by the second instance of first area break information BK1 and the first instance of second area break information BK2, and the area between the second instance of first area break information BK1 and the first instance of second area break information BK2 is referred to below as area AA3.

Subtotal related information J7 is printed on the receipt R1 on the line following the first instance of second area break information BK2. The subtotal related information J7 contains subtotal information J72. The subtotal related information J7 also contains a subtotal identifier J71, which is a text string printed to the left on the same line as the subtotal information J72, and indicates that the subtotal information J72 contains information indicating the transaction subtotal.

As shown in FIG. 5A, the subtotal identifier J71 in receipt R1 is an eight character string of the capital letters SUBTOTAL.

The subtotal related information J7 is printed based on a text string print command group GM including a text style command CM2 specifying a left alignment style, and the string print command CM3 described below. This string print command CM3 is a control command instructing consecutively printing a text string expressing the subtotal identifier J71, one or more white space characters, and a string expressing the subtotal information J72. The number of white space characters inserted between the subtotal identifier J71 string and the subtotal information J72 string is adjusted so that the subtotal information J72 is printed at the end of the line.

On the line following the subtotal related information J7 of the receipt R1 is printed tax related information J8. The tax related information J8 includes tax information J82, which is a text string expressing the amount of tax. The tax related information J8 also contains a tax information identifier J81, which is a text string printed on the left on the same line as the tax information J82 and indicates that the tax information J82 contains the amount of tax.

As shown in FIG. 5A, the tax information identifier J81 of the receipt R1 is a string containing the three capital letters TAX.

The tax related information J8 is printed based on a text string print command group GM including a text style command CM2 specifying a left alignment style, and the string print command CM3 described below. This string print command CM3 is a control command instructing consecutively printing a text string expressing the tax information identifier J81, one or more white space characters, and a text string expressing the tax information J82. The number of white space characters inserted between the tax information identifier J81 string and the tax information J82 string is adjusted so the tax information J82 is printed at the end of the line.

Transaction total related information J9 is printed on the line following the tax related information J8 on the receipt R1. The transaction total related information J9 contains transaction total information J92, which is a text string indicating the transaction total. The transaction total related information J9 also contains a transaction total identifier J91, which is a text string printed on the left on the same line as the transaction total information J92 and indicates that the transaction total information J92 contains the transaction total.

As shown in FIG. 5A, the transaction total identifier J91 of the receipt R1 is a string containing the five capital letters TOTAL.

The transaction total related information J9 is printed based on a text string print command group GM including a text style command CM2 specifying a left alignment style, and the following string print command CM3. This string print command CM3 is a control command instructing consecutively printing the transaction total identifier J91 string, one or more white space characters, and a text string expressing the transaction total information J92. The number of white space characters inserted between the transaction total identifier J91 string and the transaction total information J92 string is adjusted so the transaction total information J92 is printed at the end of the line.

When not differentiating therebetween, first area break information BK1 and second area break information BK2 are referred below to as simply area break information.

Receipt information is thus printed on receipt R1 using the following layout. That is, three instances of area break information are printed in the print area of the receipt R1, and the print area of the receipt is divided from the top by these three instances of area break information into four different areas referred to as area AA1, area AA2, area AA3, area AA4.

In area AA1 are sequentially printed the logo information J1, store address information J2, and store telephone number related information J3.

In area AA2 are sequentially printed the receipt identification related information J4 and time stamp J5.

In area AA3 is printed one or more lines of product information J6. The purchased quantity information J61, product name information J62, price information J63 contained in the product information J6 are printed sequentially on one line from left to right.

In area AA4 are sequentially printed the subtotal related information J7, tax related information J8, and transaction total related information J9.

Referring again to FIG. 3, column FB, after producing a receipt in step SB2, the printer controller 30 generates printed text data (target data) based on the print data (step SB3). The printed text data is text data containing the text of the information to print as text (characters) in the information that is printed on roll paper based on the print data. The process of step SB3 is described below.

In step SB3, the printer controller 30 extracts from the print data the control commands related to printing the strings, specifically the string print commands CM3 and line feed commands LF. Next, based on the extracted control commands, the printer controller 30 generates the printed text data containing the information to print as characters on the receipt as text.

The printer controller 30 writes the information in the printed text data in a format reflecting the line feeds that are executed when printing. The printer controller 30 writes the information in the printed text data in a format not reflecting the styles specified by the text style commands CM2. As a result, when centered or right alignment is specified as the styling to apply to a string by a text style command CM2, that styling is not reflected when writing the text in the printed text data.

FIG. 5B shows an example of the content of printed text data T1, which is the text data that is generated based on the print data related to the receipt R1 shown in FIG. 5A. As will be obvious from comparing FIG. 5B and FIG. 5A, the information printed as text in receipt R1 is written in the printed text data T1 in the same printed order and reflecting the locations of the carriage returns in the printed receipt R1.

Note that because the logo information J1 is a graphic image, it is not written in the printed text data. More specifically, as shown in FIG. 5B, information other than the information printed based on font data corresponding to character codes is not recorded in the printed text data.

Next, as shown in FIG. 3 column FB, after generating the printed text data in step SB3, the printer controller 30 sends a serial number J11, a store identifier J12, the print data received in step SB1, and the printed text data generated in step SB3, to the control server 15 (step SB4).

The serial number J11 is an identifier uniquely assigned to the printer 12 when the printer 12 is manufactured, and is stored in a specific storage area of the printer storage 32. In step SB4, the printer controller 30 acquires the serial number J11 from the specific storage area of the printer storage 32.

The store identifier J12 is information identifying the store where the printer 12 is used, and is stored in a specific storage area of the printer storage 32. In step SB4, the printer controller 30 acquires the store identifier J12 from the specific storage area of the printer storage 32.

Note that the target data in this embodiment is printed text data, but other than the printed text data, the target data may also include the serial number J11, store identifier J12, and print data.

In addition, this embodiment uses the example of a configuration in which the printer 12 generates the printed text data from the print data, but may be configured for the POS terminal 13 to generate the printed text data. In this case, the printer 12 skips the process of step SB3, and sends printed text data received from the POS terminal 13 to the control server 15.

Because the printed text data is generated from the print data output from the POS terminal 13, the printer 12 outputting the printed text data in this embodiment is equivalent to the POS terminal 13 outputting the printed text data.

Note that the control server 15 may also be configured to acquire the print data from the printer 12 and generate the printed text data.

Note that in step SB4, information related to communication required to transmit the serial number J11 (information related to the destination, the protocol used for communication, and the format of the transmitted data, for example) is previously registered in the printer 12.

As shown in FIG. 3 column FC, the acquisition unit 401 of the control server controller 40 of the control server 15 controls the control server network communicator 41 to receive the serial number J11, store identifier J12, print data, and the printed text data that were transmitted by the printer 12 (step SC1).

Next, the analyzer 402 of the control server controller 40 references the analyzer program set management database 421 (described below) and analyzer program set registration database 423 (described below), and acquires the analyzer program set KPG related to the same serial number J11 as the serial number J11 received in step SC1 (step SC2).

Figure 6:
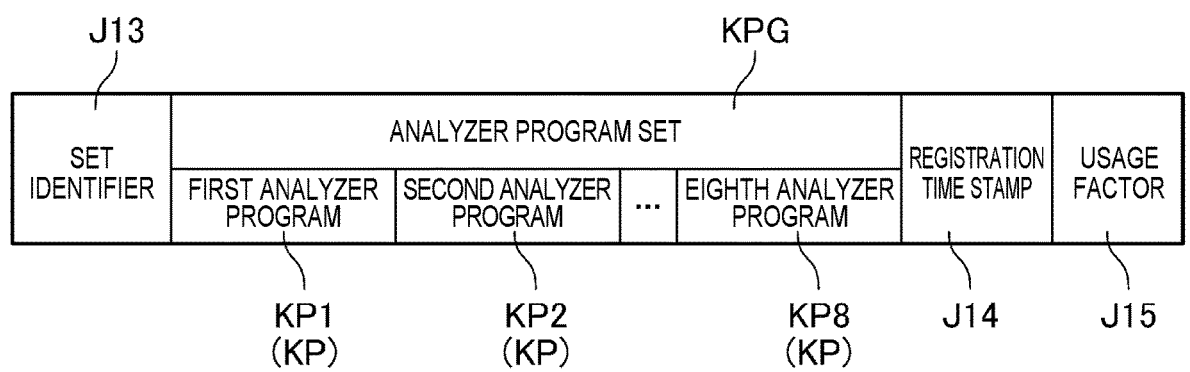
FIG. 6 shows an example of a record in an analyzer program set registration database.

FIG. 6 illustrates the data structure of information stored in one record of the analyzer program set registration database 423.

As shown in FIG. 6, each record in the analyzer program set registration database 423 includes a set identifier J13, an analyzer program set KPG, registration time stamp J14, and usage factor J15. The set identifier J13 is identification information identifying an analyzer program set KPG. The registration time stamp J14 and usage factor J15 are described below.

In the example in FIG. 6, the analyzer program set KPG includes eight analyzer programs KP, labelled first analyzer program KP1 to eighth analyzer program KP8. An analyzer program KP (first analyzer program KP1 to eighth analyzer program KP8) is described next.

Figure 7:
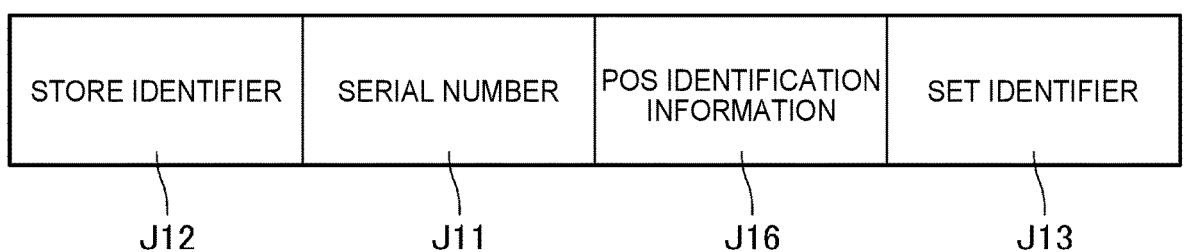
FIG. 7 shows an example of a record in an analyzer program set management database.

FIG. 7 shows an example of information stored in one record of the analyzer program set management database 421.

As shown in FIG. 7, one record in the analyzer program set management database 421 includes a store identifier J12, serial number J11, POS identification information J16, and a set identifier J13.

By storing this information in each record, the analyzer program set management database 421 relationally manages a single printer 12, the POS terminal 13 connected to that single printer 12, and the analyzer program set KPG used in the text data analysis process applied to the printed text data output by the one printer 12.

By storing this information in each record, the analyzer program set management database 421 also manages the analyzer program set KPG related to the printer 12 identified by the serial number J11, and the analyzer program set KPG related to the POS terminal 13 connected to the printer 12 identified by the serial number J11.

As will be understood below, a analyzer program set KPG contains an analytical rule set (described below). As a result, the analyzer program set management database 421 relationally stores an analytical rule set to a single printer 12 or to the POS terminal 13 connected to a single printer 12.

The analyzer 402 finds in the analyzer program set management database 421 a record having the same serial number J11 as the serial number J11 received in step SC1, and acquires the set identifier J13 from the retrieved record. The analyzer 402 also retrieves from the analyzer program set registration database 423 a record having the same set identifier J13 as the acquired set identifier J13, and acquires the analyzer program set KPG from the retrieved record in step SC2.

Referring again to FIG. 3, the analyzer 402 executes the text data analysis process based on the acquired analyzer program set KPG (step SC3). The analyzer 402 thus executes the text data analysis process using the analyzer program set KPG acquired from the analyzer program set management database 421. As a result, setting the analyzer program set KPG in the analyzer program set management database 421 in this embodiment is equivalent to setting the analyzer program set KPG for the analyzer 402.

The text data analysis process, based on the analyzer program set KPG, executes a search process on the printed text data to find the values corresponding to multiple previously defined objects, and executes an analytical process that acquires those values or determines values cannot be acquired. In the text data analysis process described below, the objects targeted for acquiring the value thereof are referred to as target objects.

In this embodiment of the invention there are eight target objects, a store address information object, store telephone number information object, receipt identifier object, receipt date information object, product information object, subtotal information object, tax information object, and total amount information object.

The value of the store address information object relates to the store address information J2 indicating the address of the store that issued the receipt.

The value of the store telephone number information object relates to the telephone number information J3 indicating the telephone number of the store that issued the receipt.

The value of the receipt identifier object relates to the receipt identifier J42 identifying a unique receipt.

The value of the receipt date information object relates to the time stamp J5 indicating when the receipt was produced.

The value of the product information object includes a product name object, purchased quantity object, and unit price object. The value of the product name object relates to the product name information J62 indicating the name of the product. The value of the purchased quantity object relates to the purchased quantity information J61 indicating the quantity purchased. The value of the unit price object relates to the price information J63 indicating the price of the product.

The value of the subtotal information object relates to the subtotal information J72 identifying the subtotal of the purchase.

The value of the tax information object relates to the tax information J82 indicating the tax amount.

The value of the total amount information object relates to the transaction total information J92 indicating the total amount of the transaction.

As described above, a analyzer program set KPG in this embodiment includes multiple analyzer programs KP.

An analyzer program KP is a program written in a specific scripting language, and more specifically is a program with functions for executing a search process on the printed text data for one object according to the analytical rules described by the process flow defined in the program, acquiring the value corresponding to the object in the printed text data, or determining that the value cannot be acquired.

An analytical rule as used herein is a rule for executing a search process on the printed text data for one object, and acquiring the value of that object in the printed text data.

For example, an analytical rule for acquiring the value of the total amount information object in the printed text data T1 shown in FIG. 5B is a rule to perform a keyword search for the string TOTAL contained in area AA4 of the printed text data T1, find the string on the same line as the TOTAL line as the object value, and extract that object value.

Because the analyzer program set KPG includes multiple analyzer programs KP, object values can be acquired for object equal to the number of analyzer programs KP from one printed text data object as defined in the analytical rule set.

An analytical rule set is a set of multiple analytical rules a single analyzer program KP follows in a process, and is a series of rules embodied by the multiple analytical rules in the set for acquiring the object values of multiple objects. In the example in FIG. 6, the analyzer program set KPG comprises first analyzer program KP1 to eighth analyzer program KP8. In other words, in the example in FIG. 6, the analyzer program set KPG acquires the object values of eight objects according to the analytical rule set comprising the eight analytical rules.

As shown in FIG. 6, the analyzer program set KPG in this embodiment includes a first analyzer program KP1 acquires the object value of the store address information object according to an analytical rule; the second analyzer program KP2 acquires the object value of the store telephone number information object according to an analytical rule; the third analyzer program KP3 acquires the object value of the receipt identifier object according to an analytical rule; the fourth analyzer program KP4 acquires the object value of the receipt date information object according to an analytical rule; the fifth analyzer program KP5 acquires the object value of the product name object according to an analytical rule; the sixth analyzer program KP6 acquires the object value of the subtotal information object according to an analytical rule; the seventh analyzer program KP7 acquires the object value of the tax information object according to an analytical rule; and the eighth analyzer program KP8 acquires the object value of the total amount information object according to an analytical rule.

Note that the text data analysis process is executed by functions of a control program installed on the control server 15, and programs associated with the control program.

To acquire the object value of a target object, or determine the value cannot be retrieved, an analyzer program KP searches for the value of the target object according to the analytical rules defined in the analyzer program KP.

For example, the eighth analyzer program KP8 performs a keyword search for the string TOTAL contained in area AA4 of the printed text data, and searches for the value of the total amount information object according to a rule describing searching the line containing the string TOTAL for the string not including space characters located to the right of the TOTAL string as the value of the total amount information object.

In another example, the fourth analyzer program KP4 looks for the value of the receipt date information object according to an analytical rule for searching the printed text data for the string on the fifth line from the top of the receipt as the value of the receipt date information object. In the case of the printed text data T1 shown in FIG. 5B, the fourth analyzer program KP4 finds and acquires a time stamp J5 indicating 1/1/2015/12:00 as the value of the receipt date information object.

As described above, a analyzer program KP looks for the value of a target object according to specific analytical rules. An analyzer program set KPG looks for the object values of each target object according to the analytical rules of each analyzer program KP in the set. For example, when any of the analyzer programs KP in the first analyzer program KP1 to eighth analyzer program KP8 included in the analytical rule set becomes unable to acquire the value of a particular target object because the layout of information printed on a receipt changed as a result of replacing the POS terminal 13, it is necessary to detect that the rule for retrieving that object value changed and inform the user of the need to change the rule.

Note that the identifiers first to eight are assigned to the analyzer programs KP described above, and these identifiers indicate that the object of the search target is different. As a result, the first analyzer program KP1 in one analyzer program set KPG, and the first analyzer program KP1 in another analyzer program set KPG that is different from the first analyzer program set KPG, both describe rules for processing the same target object, but the rules are not necessarily the same.

Referring again to FIG. 3, the analyzer 402 of the control server controller 40 generates analytical data based on the results of the text data analysis process in step SC3 (step SC4).

The analytical data is data in JSON format relating object values to each of the receipt objects described above as well as a globally unique identifier object, serial number object, and store identifier object.

The globally unique identifier object is an object related to the globally unique identifier J17 uniquely identifying the analytical data. The serial number object relates to the serial number J11 as the object value. The store identifier object relates to the store identifier J12 uniquely identifying a particular store as the object value.

After generating the analytical data, the analyzer 402 registers the resulting analytical data as a record in the analytical data manager database 422 (step SC5).

Figure 8:
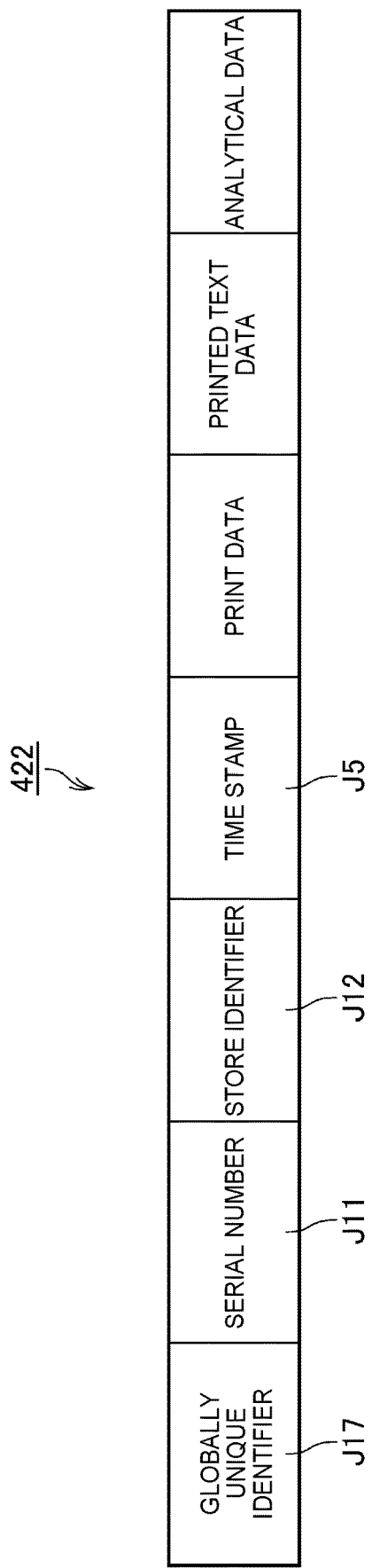
FIG. 8 shows an example of a record in an analytical data manager database.

FIG. 8 illustrates the information stored in each record in the analytical data manager database 422.

As shown in FIG. 8, each record in the analytical data manager database 422 stores a globally unique identifier J17, serial number J11, store identifier J12, time stamp J5, print data, printed text data, and analytical data.

By storing records indicating the results of text data analysis processes including search processes, the analytical data manager database 422 is equivalent to a history.

In step SC5, the control server controller 40 registers a record storing, relationally to the analytical data, the globally unique identifier J17, serial number J11, and store identifier J12 written relationally to the corresponding objects, and the received print data and the printed text data, in the analytical data manager database 422.

Multiple Web APIs (Application Programming Interfaces) are installed on the control server 15. The control server 15, in response to a request from a browser on an external device, executes processes through the installed Web APIs based on the analytical data manager database 422, and provides information required by the user.

A user as referred to here may be the owner managing a business, a management company that manages a business or an employee of the management company, or a manager other responsible employee of the business.

For example, the control server controller 40 of the control server 15, in response to a request from a browser on an external device, can provide the transaction total information J92 related to a specific receipt using the analytical data from the analytical data manager database 422.

However, the store system 11 may be changed by replacing at least one of the POS terminal 13 and printer 12, for example. One example of such a system change occurs when all of the POS terminals 13 in multiple stores in a franchise are replaced with a new model of POS terminal 13.

When such a system change occurs, the layout of the print data output by the printers 12 of the POS terminals 13 may change from the layout used before the system changed. As a result, even though the printed text data can still be acquired from the printer 12 after the POS terminal 13 is replaced, the control server 15 may not be able to find the object value of the target object by using the analyzer program set KPG that was used before the POS terminal 13 was replaced.

Suppose, for example, that the total amount information printed on the receipt is changed from the string TOTAL to the string AMOUNT. In this case, the eighth analyzer program KP8 that searches for the keyword TOTAL is unable to find the object value for the total amount information object. As a result, the control server 15 cannot acquire the transaction total information J92, which is the object value of the total amount information object, using the analyzer program set KPG that was used before the POS terminal 13 was replaced. This relates to the control server 15 becoming unable to provide the information required by the user to the user, such as the owner of the business or a store manager, for example.

This situation is not limited to physical changes in the configuration of the system, and also occurs when the layout of receipts is changed in a particular business.

To solve this problem, the control server 15 according to this embodiment of the invention operates as described below.

Figure 9:
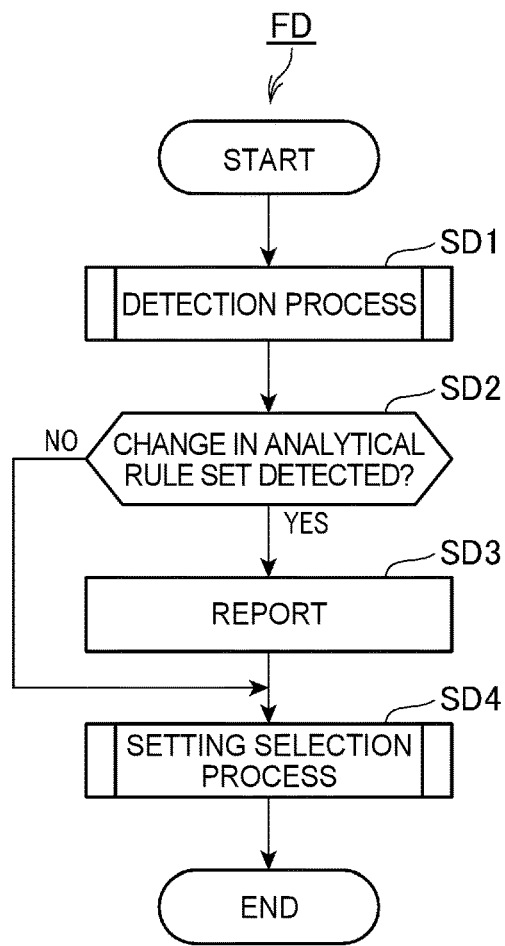
FIG. 9 is a flow chart of control server operation.

FIG. 9 is a flow chart FD of the operation of the control server 15.

The process of FIG. 9 is described by describing the operation of the detector 403 and configurator 404 of the control server controller 40 of the control server 15.

Below, the one printer 12 targeted by the operation shown in FIG. 9 is referred to as the target printer, and the POS terminal connected to the one printer 12 targeted by the operation shown in FIG. 9 is referred to as the target POS terminal.

The detector 403 of the control server controller 40 executes a detection process (step SD1). This detection process is a process of detecting whether or not the analytical rule set of the analyzer program set KPG needs changing.

This detection process is described below with reference to multiple detection processes.

First Detection Process

Figure 10:
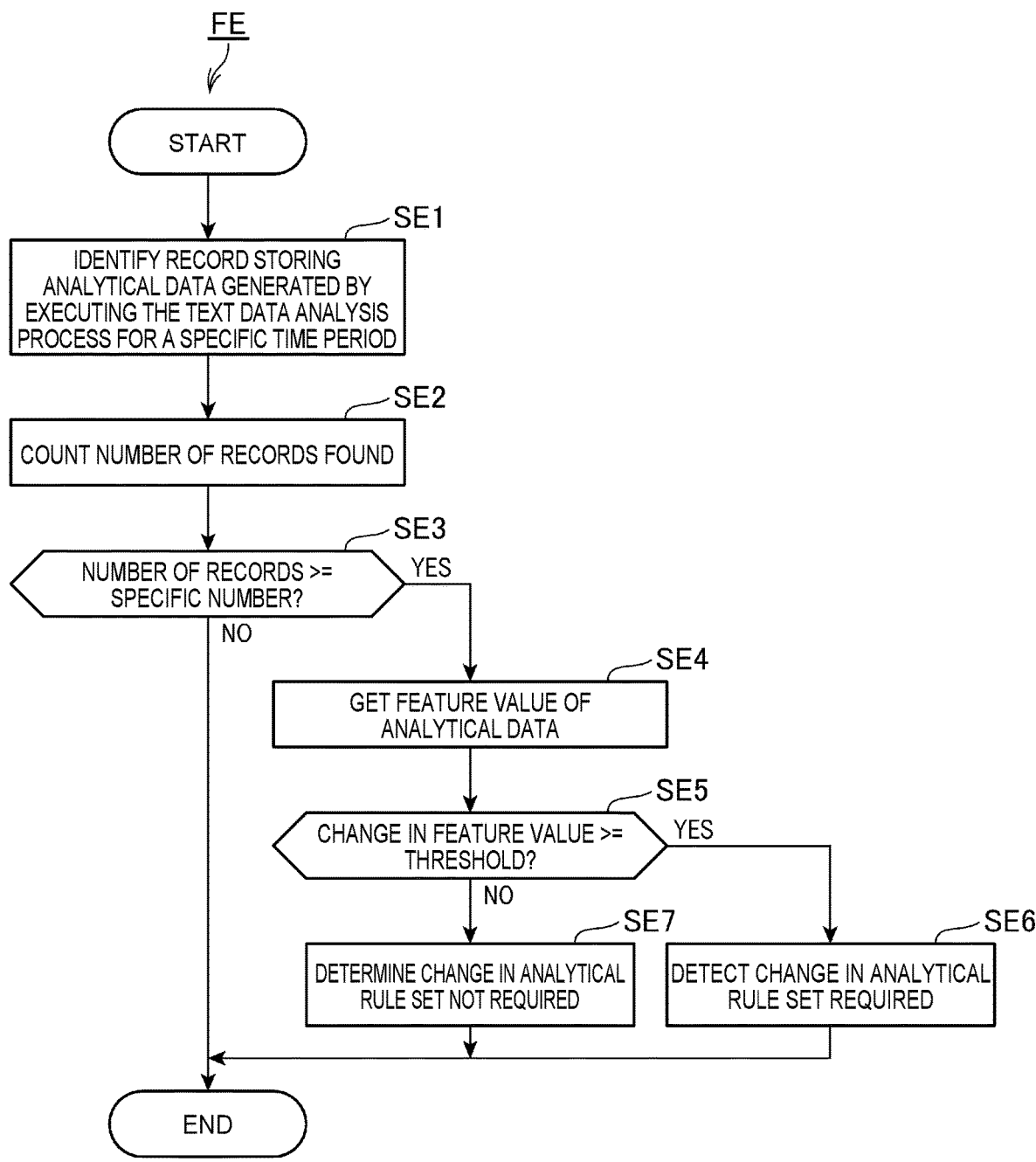
FIG. 10 is a flow chart of the operation of a detector in a first detection process.

FIG. 10 is a flow chart FE of the operation of the detector 403 in a first detection process.

The first detection process supposes that, to execute the text data analysis process, the analyzer 402 calculates a feature value, and the analytical data contains the calculated feature.

A feature value is a quantified expression of a feature of the location of an object or a feature of the location of an object value in the printed text data. A feature value may be expressed as a value set adding values to the locations of multiple objects and the locations of multiple object values, or expressed as a single value for a group of locations of multiple objects and locations of multiple object values.

The first detection process detects whether or not changing the analytical rule set of the analyzer program set KPG related to the serial number J11 of the target printer is necessary, or whether changing the analytical rule set of the analyzer program set KPG related to the target POS terminal 13 is necessary.

The detector 403 then searches the analytical data manager database 422 for the record storing analytical data generated by executing the text data analysis process for a specific time period (such as the period corresponding to the midday hours of the normal business hours of the store) (step SE1). In this event, the detector 403 searches the analytical data manager database 422 for records storing the serial number J11 of the target printer and a time stamp J5 indicating a time within the specific period.

Next, the detector 403 counts the number of records found (step SE2), and determines if the number of records found is greater than or equal to a specific number (step SE3). This specific number is a threshold value indicating a number of records needed to accurately determine whether or not the analytical rule set needs changing. This specific number is previously set based on prior tests or simulations.

If the number of records found is not greater than or equal to the specific number, that is, is less than the specific number, (step SE3: NO), the detector 403 ends the process. However, if the number of records found is greater than or equal to the specific number (step SE3: YES), the detector 403 acquires the feature value contained in the analytical data of each record retrieved (step SE4).

Next, the detector 403 determines if the change in the feature value acquired in step SE4 is greater than or equal to the specified threshold (step SE5). In this event, the detector 403 calculates the difference between the feature value contained in analytical data related to the time stamp J5 indicating a particular receipt date, and the feature value contained in analytical data related to a time stamp J5 indicating a receipt date before said particular receipt date (that is, compares features in the printed text data). The detector 403 makes the decision of step SE5 based on whether or not the calculated difference is greater than or equal to a specific threshold. If there is no change in the layout of the print data output by the POS terminal 13, the calculated difference is assumed to be 0 (zero), and if there is a change in the layout of the print data output by the POS terminal 13, the calculated difference is assumed to be a value other than 0. An example of the specific threshold as used here is therefore 0. Note that the specific threshold is not limited to 0, and may be previously set appropriately with consideration for a tolerance based on previous tests or simulations, for example.

If the change in the feature value is determined to be greater than or equal to the specific threshold (step SE5: YES), the detector 403 detects that changing the analytical rule set is necessary (step SE6). Note that detecting the need to change the analytical rule set is equivalent to detecting a rule change.

However, if the change in the feature value is determined to not be greater than or equal to the specific threshold (step SE5: NO), the detector 403 determines that changing the analytical rule set is not necessary (step SE7).

By thus comparing a feature value contained in analytical data related to a particular receipt date, with the feature value contained in analytical data related to a date before the particular receipt date, the detector 403 determines whether or not changing the analytical rule set is necessary. More specifically, the detector 403 determines whether or not changing the analytical rule set is necessary based on the change in a feature value over time. As a result, the detector 403, based on change in a feature value over time, can accurately detect a change in the analytical rule set. More specifically, the feature value numerically expresses the location of a string corresponding to an object, or the location of a string expressing an object value, in the printed text data. As a result, the detector 403 can accurately detect a change in the analytical rule set is necessary when the location of an object or the location of an object value is changed by a change in the system configuration or a change in the receipt layout.

Second Detection Process

A second detection process is described next.

Figure 11:
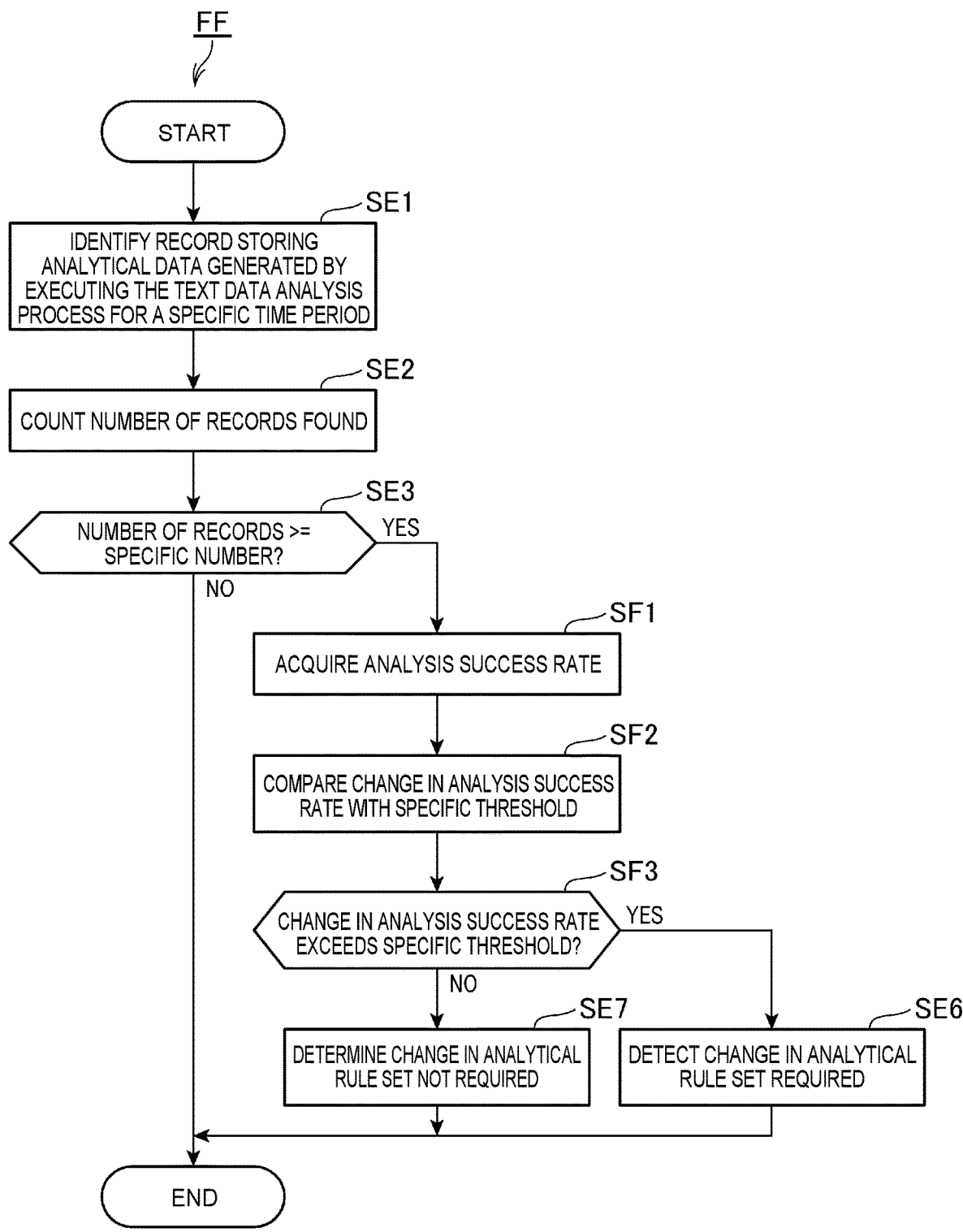
FIG. 11 is a flow chart of the operation of a detector in a second detection process.

FIG. 11 is a flow chart FF of the operation of the detector 403 in a second detection process.

Note that like steps in the flow chart FF in FIG. 11 and the flow chart FE in FIG. 10 are identified by like reference numerals, and further detailed description thereof is omitted.

The second detection process is based on the following. That is, the analyzer 402 tabulates and/or analyzes (calculates the success rate of analysis, referred to below as the analysis success rate) by a specific algorithm the object values of each object in a search process executed as part of the text data analysis process. Based on tabulating and/or analyzing the object values, the analyzer 402 acquires the analysis success rate for each object, and generates analytical data including the analysis success rate acquired for each object.

The analysis success rate indicates the rate of success finding object values in the search process. The type of text data the printer 12 sends to the control server may also include printed text data containing receipt information, text data for reports containing such information as the total sales in a business, and text data for daily sales reports containing information related to employee attendance in a business, for example. When determining the analysis success rate, the analyzer 402 determines the type of text data, and acquires the analysis success rate only for the printed text data. Various methods may be used to determine the type of text data.

The second detection process detects whether or not changing the analytical rule set is necessary for the analyzer program set KPG related to the serial number J11 of a particular printer 12, or is necessary for the analyzer program set KPG related to the POS terminal 13 connected to that printer 12.

If the number of records found is not greater than or equal to the specific number, that is, is less than the specific number, (step SE3: NO), the detector 403 ends the process.

However, if the number of records found is greater than or equal to the specific number (step SE3: YES), the detector 403 acquires the analysis success rate contained in the analytical data of each retrieved record (step SF1). In step SF1, the detector 403 acquires all analysis success rates contained in the analytical data, that is, acquires the analysis success rate of every object.

Next, the detector 403, for each object, calculates the change in the analysis success rate acquired in step SF1, and compares the calculated change in the analysis success rate with a specific threshold value (step SF2). For example, the detector 403 calculates the difference in the analysis success rate for each object, and compares the calculated analysis success rate with a specific threshold set for each object.

If there is no change in the layout of the print data output by the POS terminal 13, the calculated difference is assumed to be 0 (zero), and if there is a change in the layout of the print data output by the POS terminal 13, the calculated difference is assumed to be a value other than 0. An example of the specific threshold as used here is therefore 0. Note that the specific threshold is not limited to 0, and may be previously set appropriately with consideration for a tolerance based on previous tests or simulations, for example.

Next, the detector 403 determines whether or not there is an object for which the change in the analysis success rate exceeds the specific threshold value (step SF3). If there is an object for which the change in the analysis success rate exceeds the specific threshold value (step SF3: YES), the detector 403 detects that changing the analytical rule set is necessary (step SE6).

If there is not an object for which the change in the analysis success rate exceeds the specific threshold value, that is, the change in the analysis success rate is less than or equal to the threshold value for all objects (step SF3: NO), the detector 403 determines changing the analytical rule set is not necessary (step SF7).

By thus determining that changing the analytical rule set is necessary when the change in the analysis success rate exceeds a specific threshold for even one of the objects, the detector 403 can accurately detect if changing the analytical rule set is necessary. More specifically, the detector 403 determines changing the analytical rule set is necessary when the change in the analysis success rate exceeds the specific threshold for even one object. As a result, the detector 403 can accurately detect the analytical rule set has changed when even part of the receipt layout has changed.

The second detection process describes a configuration in which the detector 403 detects whether or not changing the analytical rule set is required based on a change in the analysis success rate. However, the second detection process is not limited to detecting a change in the analysis success rate, and may be configured to detect whether or not changing the analytical rule set is required based on the analysis success rate.

In this case, the detector 403 references the analytical data manager database 422, and finds a record storing the serial number J11 of the printer 12 that sent the printed text data, and the most recent time stamp J5. Next, the detector 403 acquires the analysis success rate for all objects in the analytical data of the retrieved record, and compares the acquired analysis success rates with a corresponding specific threshold. Because these specific thresholds are not threshold values for comparing change in the analysis success rate, a threshold of 50%, for example, differs from the threshold described above, and the decision standard also differs.

For example, if the detector 403 determines that the analysis success rate of even only one of all of the objects is below the specific threshold, the detector 403 determines changing the analytical rule set is necessary, but if the detector 403 determines that analysis success rate of all of the objects is greater than or equal to the specific threshold, the detector 403 determines changing the analytical rule set is not necessary.

As a result, when configured to detect whether or not changing the analytical rule set is necessary based on the analysis success rate, the detector 403 has the same effect as when making the same decision based on change in the analysis success rate as described above.

Third Detection Process

A third detection process is described next.

Figure 12:
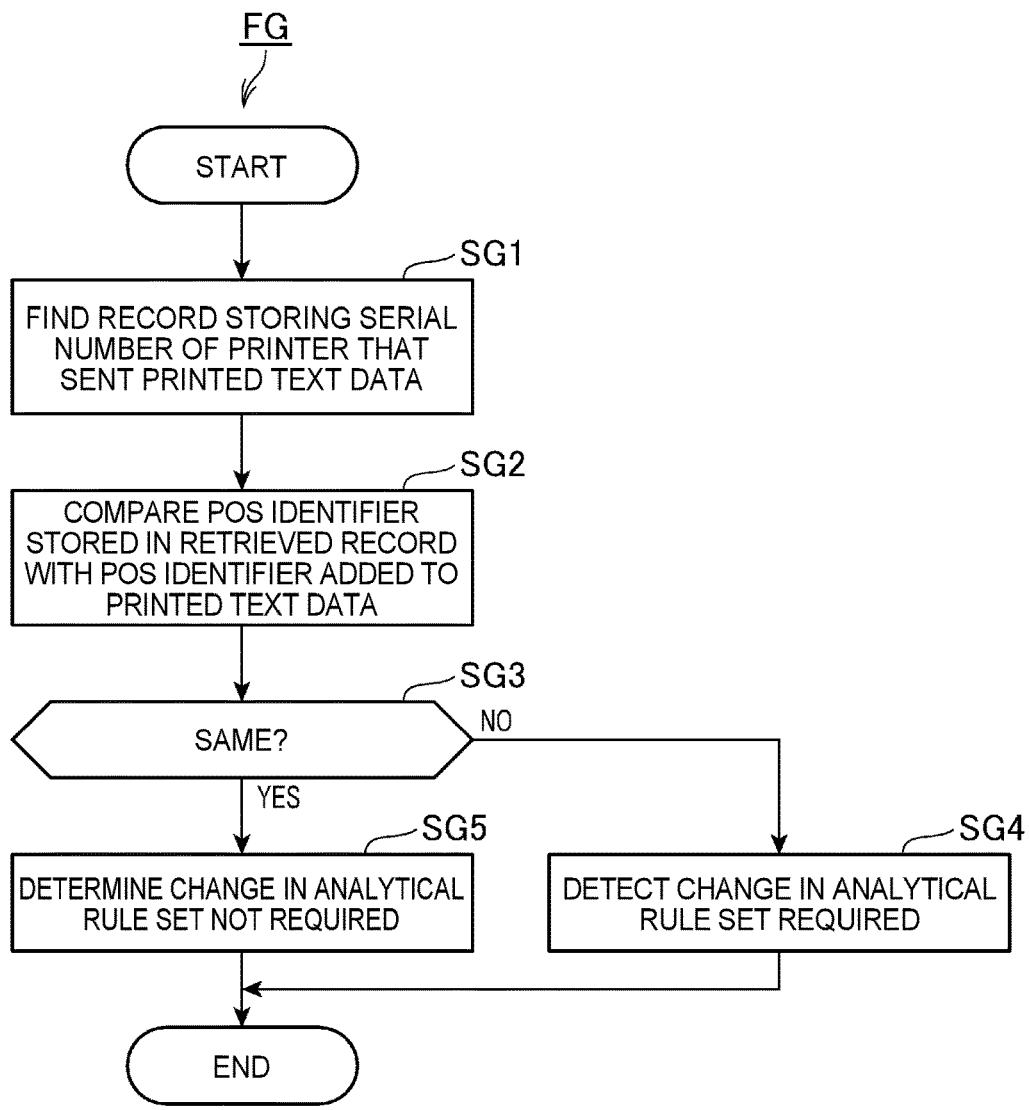
FIG. 12 is a flow chart of the operation of a detector in a third detection process.

FIG. 12 is a flow chart FG of the operation of the detector 403 in a third detection process.

The third detection process supposes that POS identification information J16 identifying the POS terminal 13 connected to the printer 12 is added to the printed text data the printer 12 sent to the control server 15 (the printed text data acquired by the acquisition unit 401). This supposes that the printer controller 30 of the printer 12 adds the POS identification information J16 stored by the printer storage 32 to the printed text data, and sends the printed text data to the control server 15 by the printer network communicator 34.

When the POS terminal 13 sends the POS identification information J16 added to the print data sent to the printer 12, the printer controller 30 of the printer 12 adds the POS identification information J16 sent from the POS terminal 13 to the printed text data sent to the control server 15. Note that the acquisition unit 401 identifying the POS terminal 13 and acquiring the printed text data is equivalent to the acquisition unit 401 acquiring printed text data to which the POS identification information J16 was added.

The third detection process detects whether or not changing the analytical rule set is necessary for the analyzer program set KPG related to the serial number J11 of a particular printer 12, or is necessary for the analyzer program set KPG related to the POS terminal 13 connected to that printer 12.

When the process shown in the flow chart FG in FIG. 12 starts, the acquisition unit 401 of the control server controller 40 has acquired printed text data with added POS identification information J16 from the printer 12.

The detector 403 references the analyzer program set management database 421, and finds records storing the serial number J11 of the printer 12 that sent the printed text data (step SG1). When a record is found in the analyzer program set management database 421, the detector 403 compares the POS identification information J16 stored in the retrieved record with the POS identification information J16 added to the printed text data (step SG2).

Next, the detector 403 determines if the POS identification information J16 stored in the retrieved record is the same as the POS identification information J16 added to the printed text data (step SG3).

When the detector 403 determines the POS identification information J16 stored in the retrieved record is not the same as the POS identification information J16 added to the printed text data (step SG3: NO), the detector 403 determines that changing the analytical rule set is necessary (step SG4).

When the detector 403 determines the POS identification information J16 stored in the retrieved record is the same as the POS identification information J16 added to the printed text data (step SG3: YES), the detector 403 determines that changing the analytical rule set is not necessary (step SG5).

In the third detection process, the detector 403 thus detects whether or not changing the analytical rule set is necessary based on change in the POS identification information J16 added to the printed text data. When either the POS terminal 13 or printer 12 is replaced in a store system 11, the POS terminal 13 connected to the printer 12 may change from the POS terminal 13 connected before the replacement. As a result, the layout of the receipts produced by the printer 12 may be different before and after the change.

The detector 403 therefore references the analyzer program set management database 421, and detects whether or not changing the analytical rule set is necessary based on the change in the POS terminal 13 connected to the target printer. As a result, the detector 403 can accurately detect a change in the analytical rule set even when the POS terminal 13 has changed.

Referring again to the flow chart FD in FIG. 9, when executing the detection process, the detector 403 determines whether or not a need to change the analytical rule set was detected (step SD2).

In step SD2, the detector 403 makes a positive decision (step SD2: YES) if a need to change the analytical rule set is detected in the detection process, and makes a negative decision (step SD2: NO) if a need to change the analytical rule set is not detected the detection process.

If need for changing the analytical rule set is not detected (step SD2: NO), the detector 403 ends the process. If need for changing the analytical rule set is detected (step SD2: YES), the detector 403 reports that changing the analytical rule set is necessary through at least one of the control server display 43 and control server network communicator 41 (step SD3).

For example, the detector 403 may report the need to change the analytical rule set in step SD3 by displaying information indicating that changing the analytical rule set is necessary through the control server display 43. In this report, the detector 403 preferably also reports the serial number J11 of the printer 12 or the POS identification information J16 related to the analyzer program set KPG requiring a change in the analytical rule set. This enables the control server 15 to make a user of the control server 15 aware that changing the analytical rule set is necessary for the analyzer program set KPG related to a particular printer 12 or the POS terminal 13 connected to a particular printer 12.

The user related to the control server 15 may be, for example, an entity such as a service provider that provides information (such as the transaction total information J92 of specific receipts) required by a server client, which may be the managing owner of a business or a company that manages stores, or an employee of such an entity, or an employee of the entity responsible for configuring and managing the analyzer program KP.

By knowing that changing the analytical rule set is necessary for the analyzer program set KPG related to a particular printer 12 or the POS terminal 13 connected to the printer 12, the user of the control server 15 has a high probability of changing the related analyzer program set KPG to an analyzer program set KPG with an appropriate analytical rule set. As a result, the probability that the control server 15 can prevent problems such as being unable to find the object value of a target object can be increased even when the configuration of the store system 11 changes or the layout of receipts changes.

Note that the method of reporting to the user is not limited to displaying information on a control server display 43, and information may be transmitted by the control server network communicator 41. In this case, the control server network communicator 41 sends to a terminal used by a user of the control server 15 information indicating that changing the analytical rule set is necessary. Reporting to the user in this way has the same effect as described above.

Next, the configurator 404 of the control server controller 40 executes a setting selection process (step SD4). A setting selection process is a process of selecting and setting in the analyzer program set management database 421 an analyzer program set KPG so that an analyzer program set KPG with an appropriate analytical rule set is linked to the printer 12 or POS terminal 13.

The setting selection process is described with reference to several examples below.

First Setting Selection Process

A first setting selection process is described first.

Figure 13:
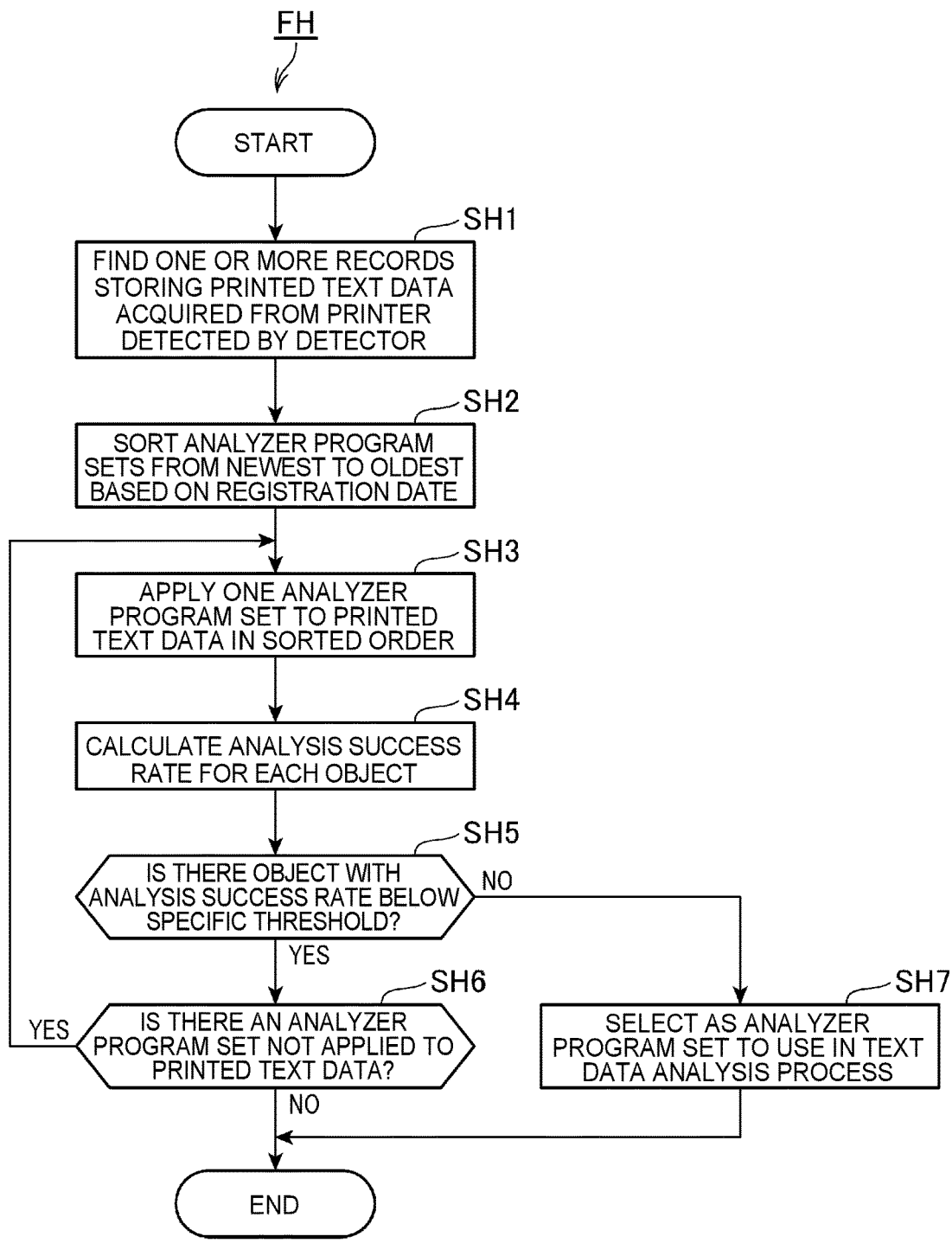
FIG. 13 is a flow chart of the operation of a configurator in a first setting selection process.

FIG. 13 is a flow chart FH of the operation of the configurator 404 in the first setting selection process.

The first setting selection process processes the analyzer program set KPG linked to the serial number J11 of a particular printer 12, or the analyzer program set KPG linked to the POS terminal 13 connected to a particular printer 12.

The configurator 404 finds in the analytical data manager database 422 one or multiple records storing printed text data acquired from a printer 12 detected by the detector 403 as requiring an analytical rule set change during a specific time period (such as the period corresponding to the midday hours of the normal business hours of the store) (step SH1). The configurator 404 searches the analytical data manager database 422 for records storing the serial number J11 of the target printer and a time stamp J5 indicating a time within the specific period.

Note that when identifying one record, the configurator 404 preferably finds the record with the time stamp J5 indicating the most recent receipt date within the specific time.

Next, when records are found, the configurator 404 sorts the analyzer program set KPG records registered in the analyzer program set registration database 423 from newest to oldest based on the registration date (date) (step SH2). The registration time stamp J14 shown in FIG. 6 is the information indicating when a record was registered in the analyzer program set registration database 423.

Next, once the analyzer program set KPG records registered in the analyzer program set registration database 423 are sorted according to the registration date, the configurator 404 applies the analyzer program sets KPG in the sorted order, that is, first applies the analyzer program set KPG with the newest registration time stamp J14, to the printed text data identified in step SH1 (step SH3).

Next, the configurator 404 calculates the analysis success rate for each object (step SH4). For example, if the process in step SH3 is the first process (the first iteration of step SH3), the configurator 404 applies the analyzer program set KPG with the newest registration time stamp J14 to the printed text data and calculates the analysis success rate of each object value.

Next, the configurator 404 compares the analysis success rate calculated for each object with a specific threshold value, and determines whether or not there is an object with an analysis success rate below the threshold (step SH5).

If the configurator 404 determines there is an object with an analysis success rate below the threshold (step SH5: YES), the configurator 404 determines if the analyzer program sets KPG stored in the analyzer program set registration database 423 include an analyzer program set KPG that has not been applied to the printed text data (step SH6).

If the configurator 404 determines there is not an analyzer program set KPG that has not been applied to the printed text data (step SH6: NO), the process ends.

If the configurator 404 determines there is an analyzer program set KPG that has not been applied to the printed text data (step SH6: YES), the configurator 404 returns to step SH3, eliminates the analyzer program set KPG that was already applied from the group of analyzer program sets KPG to apply, and applies the next-newest analyzer program set KPG to the printed text data and calculates the analysis success rate of each object value (step SH4).

Returning to step SH5, if there is not an object with an analysis success rate below the threshold value, that is, if the analysis success rate of all objects is greater than or equal to the threshold (step SH5: NO), the configurator 404 sets the analyzer program set KPG applied in step SH4 as the analyzer program set KPG used by the analyzer 402 in the text data analysis process (step SH7). This setting means changing the set identifier J13 linked in the analyzer program set management database 421 to the serial number J11 of the printer 12 that acquired the printed text data, or the set identifier J13 linked to the POS identification information J16 of the POS terminal 13 connected to the printer 12, to the set identifier J13 indicating the analyzer program set KPG applied in step SH4.

As described above, the configurator 404 applies the analyzer program sets KPG in the order registered in the analyzer program set registration database 423, and sets the analyzer program set KPG determined to have an analysis success rate greater than or equal to the specific threshold value for all objects as the analyzer program set KPG to use in the text data analysis process. As a result, the configurator 404 can link the analyzer program set KPG containing the appropriate analytical rule set to the printer 12 or POS terminal.

More specifically, the first setting selection process selects the analyzer program set KPG to set by applying the analyzer program sets KPG sequentially in the order registered in the analyzer program set registration database 423. The most recently registered analyzer program set KPG is assumed to be the analyzer program set KPG reflecting current receipt layout trends and fashions based on the registration time stamp. Therefore, by the configurator 404 applying the analyzer program sets KPG in the ordered stored in the database, there is a high probability of reducing the time required to determine the setting. In other words, the configurator 404 can efficiently select and set the appropriate analyzer program set KPG.

Second Setting Selection Process

The second setting selection process is described next.

Figure 14:
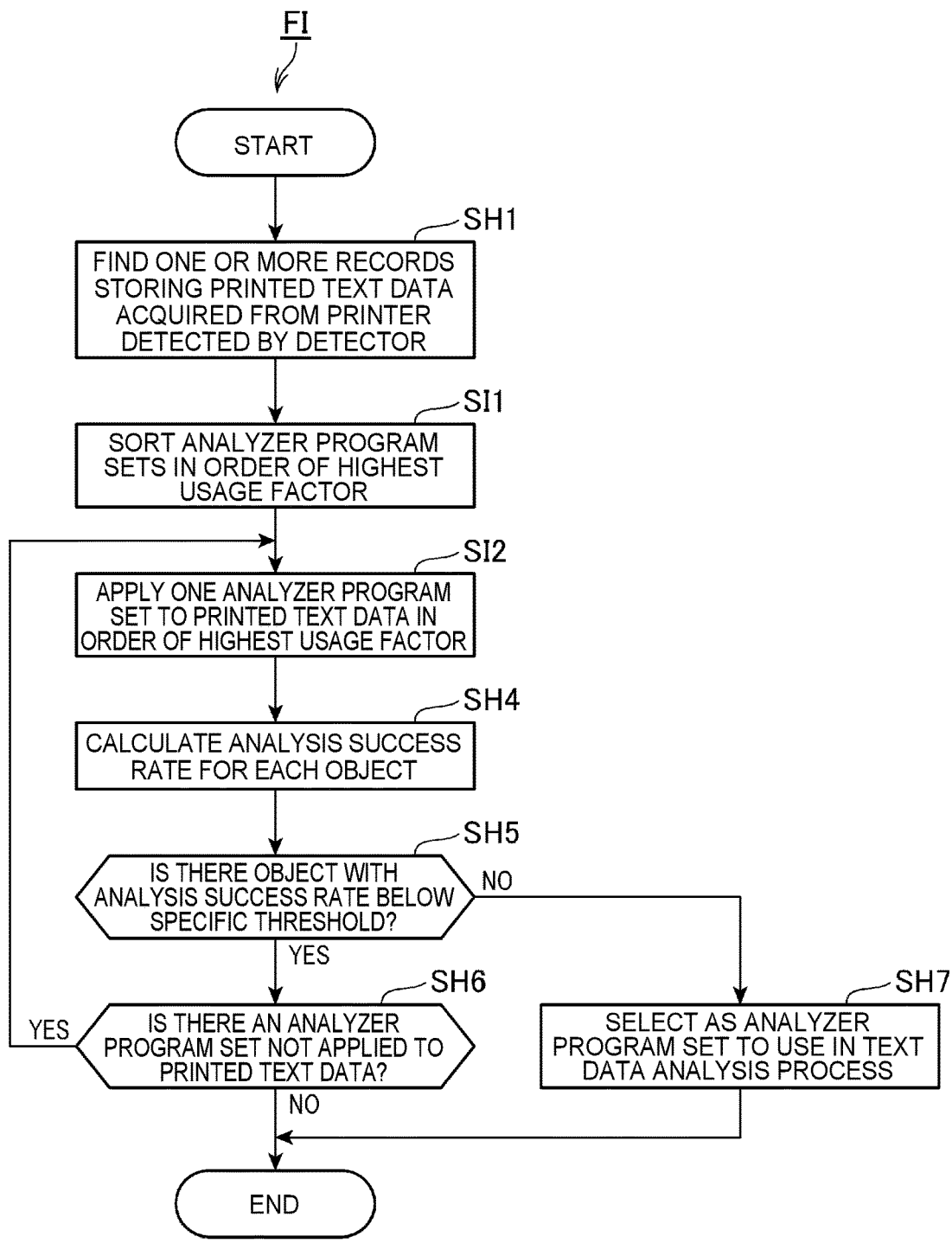
FIG. 14 is a flow chart of the operation of a configurator in a second setting selection process.

FIG. 14 is a flow chart FI of the operation of the configurator 404 in the second setting selection process.

Note that like steps in the flow chart FI in FIG. 14 and the flow chart FH in FIG. 13 are identified by like reference numerals, and further detailed description thereof is omitted.

The second setting selection process processes the analyzer program set KPG linked to the serial number J11 of a particular printer 12, or the analyzer program set KPG linked to the POS terminal 13 connected to a particular printer 12.

The configurator 404 sorts the analyzer program set KPG records registered in the analyzer program set registration database 423 in order of the highest usage factor indicated by the usage factor J15 (step SI1). The usage factor J15 is information indicating the usage rate, which is a ratio of the number of printers 12 or POS terminals 13 to which an analyzer program set KPG is related.

Next, once the analyzer program set KPG records registered in the analyzer program set registration database 423 are sorted in the order of the usage factor, the configurator 404 applies the analyzer program sets KPG in the sorted order, that is, applies the analyzer program sets KPG sequentially from the highest to lowest usage factor, to the printed text data identified in step SH1 (step SI2).

Next, the configurator 404 calculates the analysis success rate for each object (step SH4).

Next, the configurator 404 compares the analysis success rate calculated for each object with a specific threshold value, and determines whether or not there is an object with an analysis success rate below the threshold (step SH5).

If the configurator 404 determines there is an object with an analysis success rate below the threshold (step SH5: YES), the configurator 404 executes the process of step SH6. More specifically, if the configurator 404 determines there is an analyzer program set KPG that has not been applied to the printed text data (step SH6: YES), the configurator 404 returns to step SI2, eliminates the analyzer program set KPG that was already applied from the group of analyzer program sets KPG to apply, and applies the analyzer program set KPG with the next highest usage factor to the printed text data and calculates the analysis success rate of each object value (step SH4).

However, if the configurator 404 determines there is not an object with an analysis success rate below the threshold value, that is, if the analysis success rate of all objects is greater than or equal to the threshold (step SH5: NO), the configurator 404 sets the analyzer program set KPG applied in step SI2 as the analyzer program set KPG used by the analyzer 402 in the text data analysis process (step SH7).

As described above, the configurator 404 applies the analyzer program sets KPG in the order of the analyzer program set KPG with the highest usage factor, that is, applies the analyzer program sets KPG in order of the greatest number of printers 12 or POS terminals 13 linked to the analyzer program set KPG. The configurator 404 then sets the analyzer program set KPG determined to have an analysis success rate greater than or equal to the specific threshold value for all objects as the analyzer program set KPG to use in the text data analysis process. As a result, the configurator 404 can link the analyzer program set KPG containing the appropriate analytical rule set to the printer 12 or POS terminal.

More specifically, the second setting selection process selects the analyzer program set KPG to set by applying the analyzer program sets KPG sequentially in the order of the analyzer program set KPG with the highest usage factor. The analyzer program set KPG with a high usage factor means the analyzer program set KPG has a high frequency of use when analyzing the printed text data. Therefore, by the configurator 404 applying the analyzer program sets KPG in order by usage factor, there is a high probability of reducing the time required to determine the setting. In other words, the configurator 404 can efficiently select and set the appropriate analyzer program set KPG.

Third Setting Selection Process

The third setting selection process is described next.

Figure 15:
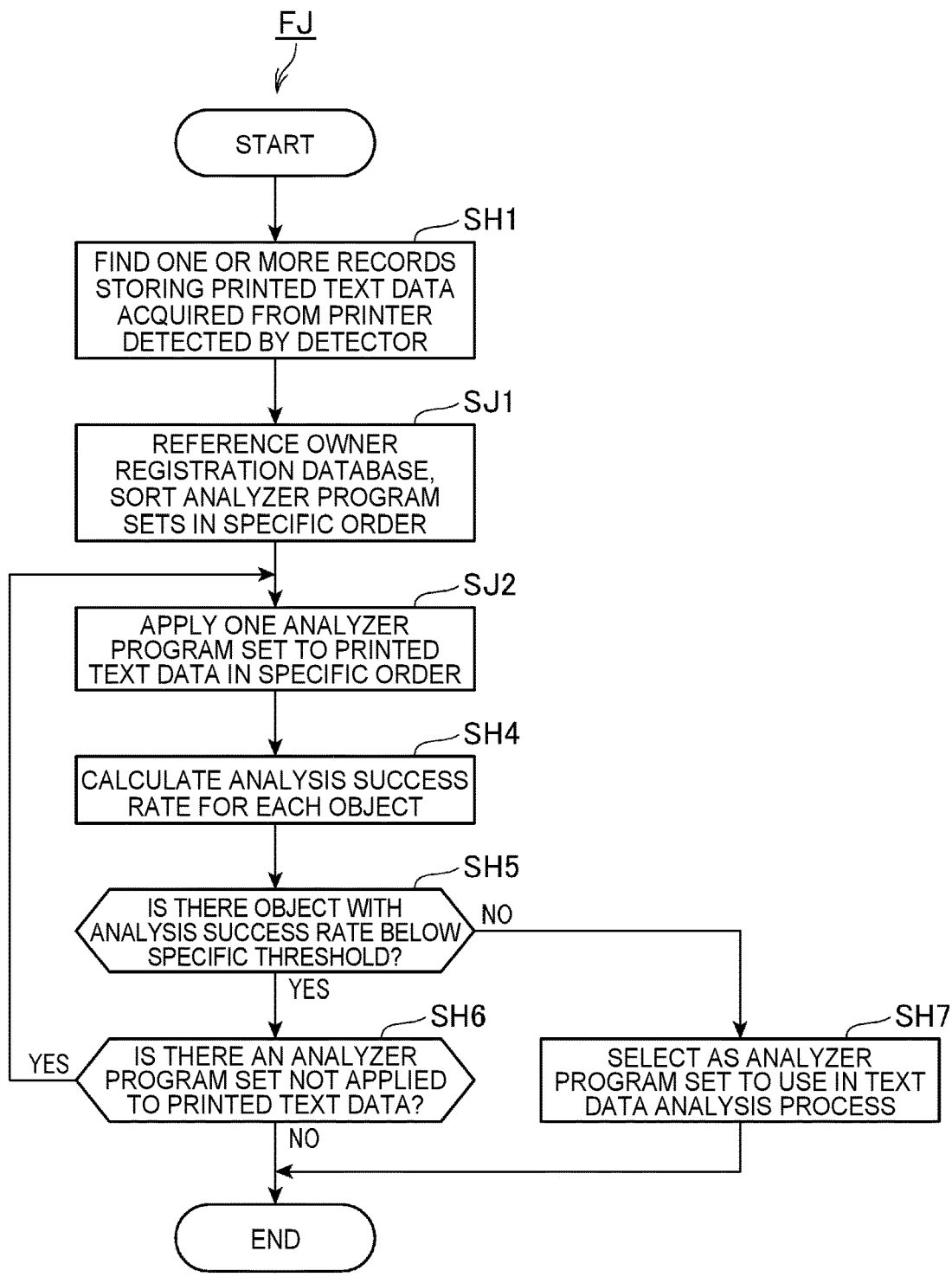
FIG. 15 is a flow chart of the operation of a configurator in a third setting selection process.

FIG. 15 is a flow chart FJ of the operation of the configurator 404 in the third setting selection process.

Note that like steps in the flow chart FJ in FIG. 15 and the flow chart FH in FIG. 13 are identified by like reference numerals, and further detailed description thereof is omitted.

The third setting selection process processes the analyzer program set KPG linked to the serial number J11 of a particular printer 12, or the analyzer program set KPG linked to the POS terminal 13 connected to the particular printer 12.

In the third setting selection process, the control server 15 acquires the owner identifier J18 (see FIG. 16) identifying the owner of the printer 12, or the POS terminal 13 connected to the printer 12, for which to set the analyzer program set KPG.

The owner as used herein means the owner managing a business or a company managing a business, for example. For example, the owner identifier J18 of the owner that owns the printer 12 is previously set in the printer storage 32, and when the printer controller 30 sends printed text data to the control server 15, adds and also sends the owner identifier J18. The control server 15 thereby acquires the owner identifier J18.

To find a record, the configurator 404 references the owner registration database 424, and sorts the records storing the owner identifier J18 in a specific order (step SJ1). The specific order in this example may be when the record was registered in the owner registration database 424, or the order of the related analyzer program set KPG with the highest usage factor.

Figure 16:
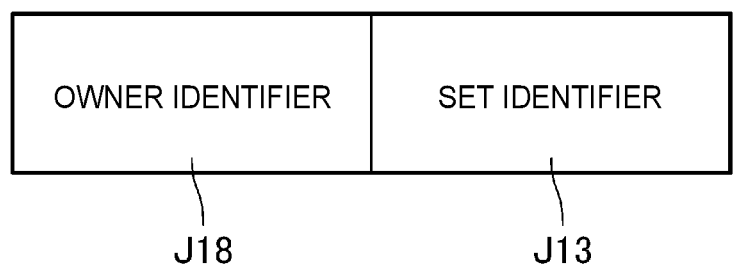
FIG. 16 shows an example of a record in an owner registration database.

FIG. 16 shows an example of information stored in each record of the owner registration database 424.

As shown in FIG. 16, each record in the owner registration database 424 stores an owner identifier J18 and a set identifier J13. In other words, the owner registration database 424 manages owners and analyzer program sets KPG. The owner registration database 424 in this example stores a separate record for each combination of owner and different analyzer program set KPG. Because the owner registration database 424 manages owners and analyzer program sets KPG, the printer 12 or POS terminal 13 set relationally to the analyzer program set KPG in one record is not limited to the target printer or target POS terminal, and may be other printers 12 or POS terminals 13 belonging to the same owner.

Next, once the analyzer program set KPG records registered in the owner registration database 424 are sorted in the specific order, the configurator 404 applies the analyzer program sets KPG in the sorted order, that is, applies the analyzer program sets KPG sequentially in the specific order, to the printed text data identified in step SH1 (step SJ2). For example, if the specific order is the order registered in the owner registration database 424, the configurator 404 applies the analyzer program set KPG with the most recent registration date to the printed text data.

Next, the configurator 404 calculates the analysis success rate for each object (step SH4).

Next, the configurator 404 compares the analysis success rate calculated for each object with a specific threshold value, and determines whether or not there is an object with an analysis success rate below the threshold (step SH5).

If the configurator 404 determines there is an object with an analysis success rate below the threshold (step SH5: YES), the configurator 404 executes the process of step SH6. More specifically, if the configurator 404 determines there is an analyzer program set KPG that has not been applied to the printed text data (step SH6: YES), the configurator 404 returns to step SJ2, eliminates the analyzer program set KPG that was already applied from the group of analyzer program sets KPG to apply, and applies the analyzer program set KPG next in the sort order to the printed text data and calculates the analysis success rate of each object value (step SH4).

However, if the configurator 404 determines there is not an object with an analysis success rate below the threshold value, that is, if the analysis success rate of all objects is greater than or equal to the threshold (step SH5: NO), the configurator 404 sets the analyzer program set KPG applied in step SJ2 as the analyzer program set KPG used by the analyzer 402 in the text data analysis process (step SH7).

As described above, the configurator 404 applies the analyzer program sets KPG common to the owner identified by the owner identifier J18, and then sets the analyzer program set KPG determined to have an analysis success rate greater than or equal to the specific threshold value for all objects as the analyzer program set KPG to use in the text data analysis process. In other words, when setting the analyzer program set KPG to use for a target printer or target POS terminal, the configurator 404 applies and sets an analyzer program set KPG linked to another printer 12 or POS terminal belonging to the same owner.

As a result, the configurator 404 can set an analyzer program set KPG with an appropriate analytical rule set for the printer 12 or POS terminal 13. More specifically, the third setting selection process prioritizes applying analyzer program sets KPG already linked to other printers 12 or POS terminals 13 belonging to the same owner to select the analyzer program set KPG to set. When the owner is the same, there is a high probability that the layout of receipts produced by the target printer should be set the same as the layout of receipts produced by other printers 12 belonging to the same owner. Therefore, by preferentially applying analyzer program sets KPG already linked to other printers 12 or POS terminals 13 belonging to the same owner, there is a high probability of reducing the time required to determine the setting. In other words, the configurator 404 can efficiently select and set the appropriate analyzer program set KPG.

Fourth Setting Selection Process

A fourth setting selection process is described next.

Figure 17:
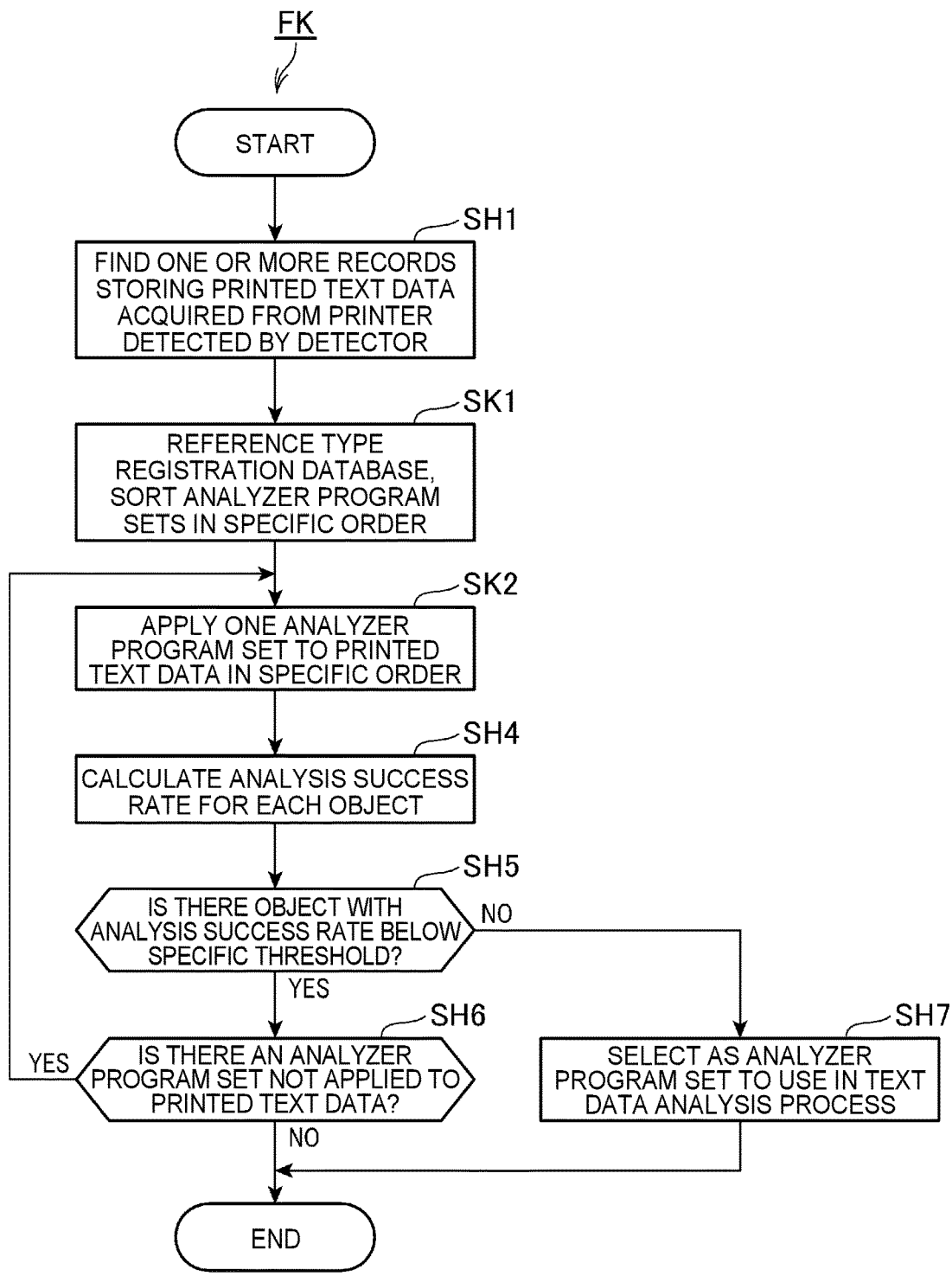
FIG. 17 is a flow chart of the operation of a configurator in a fourth setting selection process.

FIG. 17 is a flow chart FK of the operation of the configurator 404 in the fourth setting selection process.

Note that like steps in the flow chart FK in FIG. 17 and the flow chart FH in FIG. 13 are identified by like reference numerals, and further detailed description thereof is omitted.

The fourth setting selection process processes the analyzer program set KPG linked to the serial number J11 of a particular printer 12, or the analyzer program set KPG linked to the POS terminal 13 connected to the particular printer 12.

In the fourth setting selection process, the control server 15 acquires type information J19 (see FIG. 17) identifying the type of the printer 12, or the POS terminal 13 connected to the printer 12, for which to set the analyzer program set KPG.

The type information J19 may be model information indicating the model of the POS terminal 13, or attribute information indicating an attribute of the POS terminal 13. Examples of the attribute information include the type of POS terminal, that is, whether it is a tablet device or a desktop device. For example, the type information J19 is previously stored in the printer storage 32, and when the printer controller 30 sends printed text data to the control server 15, adds and also sends the type information J19. The control server 15 thereby acquires the type information J19.

To find a record, the configurator 404 references the type registration database 425, and sorts the records storing the same type information J19 as the acquired type information J19 in a specific order (step SK1). The specific order in this example may be when the record was registered in the type registration database 425, or the order of the related analyzer program set KPG with the highest usage factor.

Figure 18:
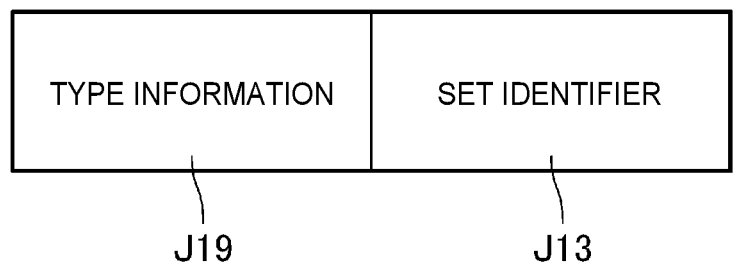
FIG. 18 shows an example of a record in a type registration database.

FIG. 18 shows an example of information stored in each record of the type registration database 425.

As shown in FIG. 18, each record in the type registration database 425 stores type information J19 and a set identifier J13. In other words, the type registration database 425 manages POS terminal 13 types and analyzer program sets KPG. The type registration database 425 in this example stores a separate record for each combination of device type and different analyzer program set KPG. Because the type registration database 425 manages POS terminal 13 types and analyzer program sets KPG, the printer 12 or POS terminal 13 set relationally to the analyzer program set KPG in one record is not limited to the target printer or target POS terminal, and may be other printers 12 or POS terminals 13 of the same type.

Next, once the analyzer program set KPG records registered in the type registration database 425 are sorted in the specific order, the configurator 404 applies the analyzer program sets KPG in the sorted order, that is, applies the analyzer program sets KPG sequentially in the specific order, to the printed text data identified in step SH1 (step SK2). For example, if the specific order is the order registered in the type registration database 425, the configurator 404 applies the analyzer program set KPG with the most recent registration date to the printed text data.

Next, the configurator 404 calculates the analysis success rate for each object (step SH4).

Next, the configurator 404 compares the analysis success rate calculated for each object with a specific threshold value, and determines whether or not there is an object with an analysis success rate below the threshold (step SH5).

If the configurator 404 determines there is an object with an analysis success rate below the threshold (step SH5: YES), the configurator 404 executes the process of step SH6. More specifically, if the configurator 404 determines there is an analyzer program set KPG that has not been applied to the printed text data (step SH6: YES), the configurator 404 returns to step SK2, eliminates the analyzer program set KPG that was already applied from the group of analyzer program sets KPG to apply, and applies the analyzer program set KPG next in the sort order to the printed text data and calculates the analysis success rate of each object value (step SH4).

However, if the configurator 404 determines there is not an object with an analysis success rate below the threshold value, that is, if the analysis success rate of all objects is greater than or equal to the threshold (step SH5: NO), the configurator 404 sets the analyzer program set KPG applied in step SK2 as the analyzer program set KPG used by the analyzer 402 in the text data analysis process (step SH7).

As described above, the configurator 404 applies the analyzer program sets KPG with the same type information J19, and then sets the analyzer program set KPG determined to have an analysis success rate greater than or equal to the specific threshold value for all objects as the analyzer program set KPG to use in the text data analysis process. In other words, when setting the analyzer program set KPG to use for a target printer or target POS terminal, the configurator 404 applies and sets a analyzer program set KPG linked to another printer 12 or POS terminal of the same type.

As a result, the configurator 404 can set an analyzer program set KPG with an appropriate analytical rule set for the printer 12 or POS terminal 13. More specifically, the fourth selection setting process prioritizes applying analyzer program sets KPG already linked to other printers 12 or POS terminals 13 of the same type to select the analyzer program set KPG to set.

In the case of a company that manages multiple stores in a franchise arrangement, there is a high probability that the POS terminals 13 used in the multiple stores are the same type (model or attribute). Therefore, by preferentially applying analyzer program sets KPG already linked to other printers 12 or POS terminals 13 of the same type, there is a high probability of reducing the time required to determine the setting. In other words, the configurator 404 can efficiently select and set the appropriate analyzer program set KPG.

Fifth Setting Selection Process

A fifth setting selection process is described next.

Figure 19:
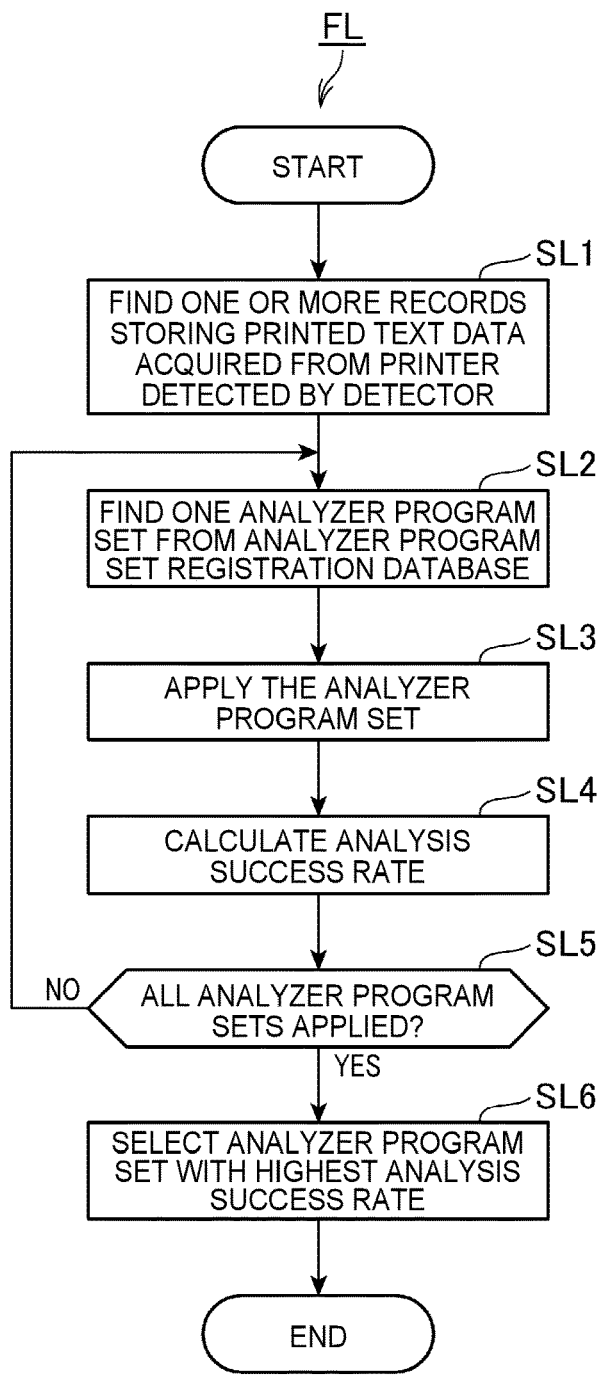
FIG. 19 is a flow chart of the operation of a configurator in a fifth setting selection process.

FIG. 19 is a flow chart FK of the operation of the configurator 404 in the fifth setting selection process.

The fifth setting selection process processes the analyzer program set KPG linked to the serial number J11 of a particular printer 12, or the analyzer program set KPG linked to the POS terminal 13 connected to a particular printer 12.

The configurator 404 finds in the analytical data manager database 422 one or multiple records storing printed text data acquired from a printer 12 detected by the detector 403 as requiring an analytical rule set change during a specific time period (step SL1). The configurator 404 searches the analytical data manager database 422 for records storing the serial number J11 of the printer and a time stamp J5 indicating a time within the specific period.

Note that when identifying one record, the configurator 404 preferably finds the record with the time stamp J5 indicating the most recent receipt date within the specific time.

Next, when a record is found, the configurator 404 identifies the analyzer program set KPG applied to the printed text data stored in that record in the analyzer program set registration database 423 (step SL2). Next, the configurator 404 applies the identified analyzer program set KPG to the printed text data (step SL3), and calculates the analysis success rate for each object (step SL4).

Next, the configurator 404 determines whether or not all analyzer program sets KPG stored in the analyzer program set management database 421 were applied to the printed text data (step SL5). If the configurator 404 determines all analyzer program sets KPG were not applied (step SL5: NO), the configurator 404 returns to step SL2, identifies an analyzer program set KPG that has not been applied to the printed text data, and repeats the process from step SL3.

However, if the configurator 404 determines all analyzer program sets KPG were applied (step SL5: YES), the configurator 404 selects the analyzer program set KPG with the highest analysis success rate as the analyzer program set KPG for the analyzer 402 to apply in the text data analysis process (step SL6). For example, configurator 404 sums the analysis success rates calculated for all of the objects, and selects from the multiple the analyzer program sets KPG the analyzer program set KPG having the highest total analysis success rate as the analyzer program set KPG for the analyzer 402 to apply in the text data analysis process.

The configurator 404 thus applies all analyzer program sets KPG, and sets the analyzer program set KPG having the highest total analysis success rate as the analyzer program set KPG for the analyzer 402 to apply in the text data analysis process. As a result, the configurator 404 can reliably link the analyzer program set KPG with the appropriate analytical rule set to the printer 12 or POS terminal.

As described above, the control server controller 40, by executing a detection process and setting selection process, can set the analyzer program set KPG with the appropriate analytical rule set without requiring intervention (operation) by a user of the control server 15. As a result, even if the physical configuration of the store system 11 is changed or the layout of receipts is changed, the control server 15 can quickly and automatically select and link the analyzer program set KPG with the appropriate analytical rule set to each printer 12 or POS terminal. As a result, even when the system configuration changes or the receipt layout changes, the control server 15 can provide information required by a user to the user, such as an owner running a business or the manager of a store.

The detection process of the invention is described above with reference to a first detection process to third detection process, and the setting selection process is described with reference to a first setting selection process to fifth setting selection process. However, the detection processes and setting selection processes used to execute the operation shown in FIG. 9 may be combined in various ways. Such combinations also include combinations not executing a detection process or setting selection process. Several examples of such combinations are described below.

First Combination

This first combination combines the second detection process and the first setting selection process in the operation of the control server 15 shown in FIG. 9.

More specifically, the detector 403 detects change in the analytical rule set of the analyzer program set KPG appropriate to the target printer or target POS terminal based on change in the analysis success rate or based on the analysis success rate.

When the detector 403 detects a need to change the analytical rule set, the configurator 404 applies the analyzer program sets KPG sequentially based on when the analyzer program sets KPG were registered in the analyzer program set registration database 423, and sets the appropriate analyzer program set KPG. As a result, the control server 15 achieves the effect described above in the detection process and setting selection process, and can set the analyzer program set KPG with the analytical rule set appropriate to the target printer or target POS terminal without requiring manual intervention by the user of the control server 15.

Second Combination

This second combination combines the first detection process and the second setting selection process in the operation of the control server 15 shown in FIG. 9.

More specifically, the detector 403 detects change in the analytical rule set of the analyzer program set KPG appropriate to the target printer or target POS terminal based on change in the analysis success rate or based on change in the location of objects or change in the location of object values in the printed text data.

When the detector 403 detects a need to change the analytical rule set, the configurator 404 applies the analyzer program sets KPG sequentially according to the usage rate, and sets the appropriate analyzer program set KPG. As a result, the control server 15 achieves the effect described above in the detection process and setting selection process, and can set the analyzer program set KPG with the analytical rule set appropriate to the target printer or target POS terminal without requiring manual intervention by the user of the control server 15.

Third Combination

This third combination combines the first detection process and the fifth setting selection process in the operation of the control server 15 shown in FIG. 9.

More specifically, the detector 403 detects change in the analytical rule set of the analyzer program set KPG appropriate to the target printer or target POS terminal based on change in the analysis success rate or based on change in the location of objects or change in the location of object values in the printed text data.

When the detector 403 detects a need to change the analytical rule set, the configurator 404 applies all analyzer program sets KPG, and sets the appropriate analyzer program set KPG with the highest analysis success rate. As a result, the control server 15 achieves the effect described above in the detection process and setting selection process, and can set the analyzer program set KPG with the analytical rule set appropriate to the target printer or target POS terminal without requiring manual intervention by the user of the control server 15.

Fourth Combination

This fourth combination executes the third setting selection process without executing the detection process in the operation of the control server 15 shown in FIG. 9.

In this combination, the control server 15 skips step SD1 to step SD3, and executes only step SD4.

An example of a configuration in which this fourth combination may be used is when the configuration of the store system 11 in a particular store changes, and the owner that configured the store (store system 11) informs the user (operator) of the control server 15 that the system configuration changed.

In this event, the detector 403 skips the detection process because there is no need to detect the change in the analytical rule set. The configurator 404 applies the analyzer program sets KPG used by the owner identified by the owner identifier J18, and sets the analyzer program set KPG determined to have an analysis success rate for all objects greater than or equal to a specific threshold as the analyzer program set KPG to use in the text data analysis process. As a result, the control server 15 achieves the effect described above in the setting selection process, and can set the analyzer program set KPG with the analytical rule set appropriate to the target printer or target POS terminal without requiring manual intervention by the user of the control server 15.

As described above, a control server 15 (information processing device) according to the invention has an acquisition unit 401 configured to acquire printed text data (target data) containing the object values of multiple objects printed on roll paper (print medium) according to a specific layout as text data corresponding to the specific layout; an analyzer 402 (controller) configured to execute a search process on the printed text data acquired by the acquisition unit 401 to find the value (object value) of a search target object based on the analytical rule set (rule) set for the search target object; a detector 403 configured to detect change in an analytical rule set defined for the analyzer 402; and at least one of a control server display 43 (reporting device) or control server network communicator 41 (reporting device) configured to report change in the analytical rule set.

Because this configuration detects change in an analytical rule set used to search for an object value and reports the change in the analytical rule set, a user of the control server 15 can be made aware of the need to change the analytical rule set.

The detector 403 acquires a feature value (detects a feature) of the printed text data acquired by the acquisition unit 401 for a specific receipt date, and detects change in the analytical rule set by comparing the acquired feature value with the feature value of the printed text data acquired by the acquisition unit 401 before the specific receipt date. By comparing the feature value of the printed text data acquired for a specific receipt date with the feature value of the printed text data acquired before the specific receipt date, this configuration can accurately detect change in the analytical rule set based on change in the feature over time.

The detector 403 detects change in the analytical rule set when there is a change in the location of an object or the location of an object value in the printed text data. By detecting change in the analytical rule set when there is a change in the location of an object or the location of an object value in the printed text data, this configuration can accurately detect change in the analytical rule set.

For at least some objects included in the multiple objects in the printed text data, the detector 403 detects change in the analytical rules set relationally to those objects. By detecting change in the analytical rules set relationally to at least some objects included in the multiple objects in the printed text data, this configuration can accurately detect change in the analytical rule set even when part of the layout has changed.

By searching for object values contained in the printed text data, the analyzer 402 also executes a search process including at least one of evaluating the type of printed text data, and tabulating or analyzing the object value of each object. Based on the rate of success analyzer 402 success in the search process or change in the rate of success, the detector 403 detects change in the analytical rule set. Because this configuration detects change in the analytical rule set based on the success rate of the analyzer 402 in the search process or change in the success rate, change in the analytical rule set can be accurately detected.

The control server 15 also has a control server storage 42 (storage device) that stores an analytical data manager database 422 (history information) indicating the results of the search processes conducted by the analyzer 402. The detector 403 detects change in the analytical rule set based on the analytical data manager database 422 stored in the control server storage 42. Because this configuration detects change in the analytical rule set based on the analytical data manager database 422 stored in the control server storage 42, past search results can be used in the detection process, and change in the analytical rule set can be accurately detected.

In another configuration, the acquisition unit 401 identifies the POS terminal 13 (device) that output the printed text data when the printed text data is acquired. The analyzer 402 runs a search process looking for the object values of a target object according to the analytical rule set relationally linked to the POS terminal 13 that output the printed text data and the target search object. The detector 403 detects change in the analytical rule set that is set relationally to the POS terminal that output the printed text data to which the search process was applied. By detecting change in the analytical rule set applied to a specific POS terminal 13, this configuration can reliably detect change in the analytical rule set applied to each POS terminal 13.

When POS identification information (device identification information) is added to the printed text data the acquisition unit 401 acquires, the detector 403 detects change in the analytical rule set based on change in the POS identification information J16 added to the printed text data. By detecting change in the analytical rule set based on change in the POS identification information J16 added to the printed text data, this configuration can reliably detect change in the analytical rule set even when the POS terminal 13 that output the printed text data changes.

A control server 15 according to another aspect of the invention has an acquisition unit 401 configured to acquire printed text data containing the object values of multiple objects printed on roll paper according to a specific layout as text data corresponding to the specific layout; an analyzer 402 configured to execute a search process on the printed text data acquired by the acquisition unit 401 to find the object value of a search target object according to object rules set for the search target object; control server storage 42 (rule storage) readably storing multiple analytical rule sets that can be selectively set for use by the analyzer 402; and a configurator 404 that selects and sets for the analyzer 402 one of the analytical rule sets stored in the control server storage 42.

This configuration selects and sets a stored an analytical rule set from the control server storage 42 in which the analytical rule sets are readably registered, and can thereby set the appropriate analytical rule set for the text data analysis process (analysis) of the control server 15.

The acquisition unit 401 identifies the POS terminal 13 that output the printed text data to acquire the printed text data. The analyzer 402 runs a search process according to the analytical rule set relationally linked to the POS terminal 13 and an object in the printed text data. The configurator 404 selects one of the analytical rule sets stored in the control server storage 42, and sets the analytical rule set for the analyzer 402 relationally to the POS terminal 13 and object in the printed text data.

By setting an analytical rule set selected from the control server storage 42 relationally to the POS terminal 13 and object in the printed text data, this configuration can set an analytical rule set appropriate to the printed text data output by the POS terminal 13.

The configurator 404 may also select the analytical rule sets stored in the control server storage 42 sequentially according to a registration date (time) indicating when the analytical rule set was registered in the control server storage 42. By selecting the analytical rule sets sequentially according to the registration date, the configurator 404 in this configuration can efficiently select the analytical rule set to use. As a result, the configurator 404 can shorten the time required to select and set the analytical rule set.

The configurator 404 may also select the analytical rule sets stored in the control server storage 42 sequentially according to the greatest number of POS terminals 13 for which an analytical rule set is set for the analyzer 402 (that is, has the highest usage factor). By selecting the analytical rule sets sequentially according to the number of POS terminals 13 for which the analytical rule set is set for the analyzer 402, the configurator 404 in this configuration can efficiently select the analytical rule set to use for analysis. As a result, the configurator 404 can shorten the time required to select and set the analytical rule set.

When setting the analytical rule set relationally to the POS terminal 13, the configurator 404 may select the analytical rule set that is set relationally to other POS terminals 13 used by the owner of the target POS terminal. By selecting an analytical rule set that is already set for other POS terminals 13 used by the owner of the target POS terminal 13, the configurator 404 in this configuration can efficiently select the analytical rule set to use for analysis. As a result, the configurator 404 can shorten the time required to select and set the analytical rule set.

When setting the analytical rule set relationally to the POS terminal 13, the configurator 404 may select the analytical rule set that is set relationally to other POS terminals 13 of the same model or attribute as the target POS terminal. By selecting an analytical rule set that is already set for other POS terminals 13 of the same model or attribute as the target POS terminal 13, the configurator 404 in this configuration can efficiently select the analytical rule set to use for analysis. As a result, the configurator 404 can shorten the time required to select and set the analytical rule set.

The control server 15 in another example also has a detector 403 that detects change in the analytical rule set that is set for the analyzer 402. When the detector 403 detects change in the analytical rule set, the configurator 404 selects and sets the analytical rule set for the analyzer 402. By selecting and setting the analytical rule set for the analyzer 402 when the detector 403 detects a change in the analytical rule set, setting an analytical rule set when not necessary can be avoided, and the analytical rule set appropriate for analysis by the control server 15 can be reliably set.

The invention is described above with reference to a preferred embodiment thereof, but the invention is not limited thereto and can be modified and adapted in many ways without departing from the scope of the accompanying claims.

For example, the objects the analyzer program set KPG searches for are not limited to the foregoing. Other examples of objects the analyzer program set KPG may search for include but are not limited to a customer identifier object to which identification information of the customer that completed a transaction is related as the object value; a returned-item information object to which information indicating whether or not an item was returned is related as the object value; and a payment method information object to which information indicating the method of payment is related as the object value.

In this event, the analyzer program set KPG is configured to include analyzer programs KP for the corresponding objects.

The number of analyzer programs KP included in the analyzer program set KPG is also not limited to eight, and may differ in different analyzer program sets KPG.

The type of analyzer programs KP included in an analyzer program set KPG may also differ according to the analyzer program set KPG.

The foregoing embodiments also describe configurations that change the analyzer program set KPG related to the printer 12 or POS terminal 13 by analyzer program set KPG units, but configurations that change an analyzer program set KPG at the level of the analyzer program KP units in the analyzer program set KPG are also conceivable.

When the control method of the control server 15 described above (control method of an information processing device) is executed by a computer of the control server 15, or by an external device connected to the control server 15, the invention can also be embodied by a program executed by a computer to implement the foregoing method, a storage medium recording the program readably by the computer, or a communication medium able to transfer the program. The recording medium may also be a magnetic or optical recording medium, or a semiconductor memory device, for example. More specifically, the recording medium may be a floppy disk, HDD (Hard Disk Drive), CD-ROM (Compact Disk Read Only Memory), DVD (Digital Versatile Disk), Blu-ray® Disc, magneto-optical disc, flash memory device, card media, or other type of removable or fixed recording medium. The storage medium may also be an internal storage medium of the control server 15 or an external device connected to the control server 15, such as RAM (random access memory) or a nonvolatile memory device such as ROM (read-only memory) or a hard disk drive.

The processing units shown in the flow charts in FIG. 3, FIG. 9, FIG. 10, FIG. 11, FIG. 12, FIG. 13, FIG. 14, FIG. 15, FIG. 17, and FIG. 19 are also used to facilitate understanding the processes of the POS terminal 13, printer 12, and control server 15, are divided according to the main content of the process, and the invention is not limited by the method of dividing and naming the process units. The processes may be further divided into more steps according to the process content. Individual process units may also be further divided into more processes.

The function units shown in FIG. 2 illustrate desirable functional configurations, and the specific configuration of the invention is not limited thereto. More specifically, hardware components corresponding individually to each function unit are not necessarily required, and configurations in which a single processor embodies the functions of multiple function units by executing a specific program or programs are obviously conceivable. Some functions embodied by software in the foregoing embodiments may instead be embodied by hardware, and some functions embodied by hardware in the foregoing embodiments may instead be embodied by software. The detailed configuration of other parts of the POS terminal 13, printer 12, and control server 15 may also be varied as desired without departing from the scope of the invention described in the accompanying claims.

This application claims priority under 35 U.S.C. § 119 to Japanese Patent Application No. 2017-190220, filed Sep. 29, 2017. The entire disclosure of Japanese Patent Application No. 2017-190220 is hereby incorporated herein by reference.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An information processing device that registers a record relating an object value to an object in a data manager database, the information processing device comprising:
 a processor; and
 memory storing an analytical rule for acquiring the object value and non-transitory processor-executable instructions that, when executed by the processor, cause the processor to:
 acquire target data based on print data for printing according to a specific layout;
 execute a search process on the acquired target data to acquire the object value corresponding to the object using the analytical rule;
 determine whether the object value is acquired using the analytical rule;
 register the object value in the data manager database when the object value is acquired; and
 inform a user that the analytical rule should be changed when the object value is not acquired using the analytical rule.

2. The information processing device described in claim 1, wherein the instructions, when executed by the processor, further cause the processor to:
 calculate a feature value of the acquired target data, the feature value being a quantified expression of a feature of a location of the object or the object value in the target data;
 register the feature value in the data manager database;
 determine if a change in the feature value is greater than or equal to a specified threshold; and
 determine that the analytical rule should be changed.

3. The information processing device described in claim 1, wherein the target data includes a plurality of objects and corresponding object values and the instructions, when executed by the processor, further cause the processor to:
 detect a change in a plurality of analytical rules respectively corresponding to the plurality of objects.

4. The information processing device described in claim 1, wherein:
 the search process includes at least one of determining a type of the target data and tabulating or analyzing the object value of the object, and
 the instructions, when executed by the processor, further cause the processor to:
 calculate a rate of success, or change in the rate of success, of the search process; and
 determine that the analytical rule should be changed.

5. The information processing device described in claim 1, wherein the instructions, when executed by the processor, further cause the processor to:
 identify a device that output the target data; and
 select the analytical rule based on an association between the device that output the target data and the analytical rule.

6. The information processing device described in claim 5, wherein the instructions, when executed by the processor, further cause the processor to:
 acquire device identification information identifying a device when the target data includes the device identification information, and
 determine whether the analytical rule should be changed.

7. A control method of an information processing device that registers a record relating an object value to an object in a data manager database, the control method comprising:
 storing an analytical rule for acquiring the object value;
 acquiring target data based on print data for printing according to a specific layout;
 executing a search process on the acquired target data to acquire the object value corresponding to the object using an analytical rule;
 determining whether the object value is acquired using the analytical rule;
 registering the object value in the data manager database when the object value is acquired; and
 informing a user that the analytical rule should be changed when the object value is not acquired using the analytical rule.

8. The method of claim 7, further comprising:
 calculating a feature value of the acquired target data, the feature value being a quantified expression of a feature of a location of the object or the object value in the target data;
 registering the feature value in the data manager database;
 determining if a change in the feature value is greater than or equal to a specified threshold; and
 determining that the analytical rule should be changed.

9. The method of claim 7, wherein the target data includes a plurality of objects and corresponding object values and the instructions, and the method further comprises detecting a change in a plurality of analytical rules respectively corresponding to the plurality of objects.

10. The method of claim 7, wherein:
the search process includes at least one of determining a type of the target data and tabulating or analyzing the targeted object value of the targeted object,
calculating a rate of success, or change in the rate of success, of the search process, and
determining that the analytical rule should be changed.

11. The method of claim 7, further comprising:
identifying a device that output the target data; and
selecting the analytical rule based on an association between the device that output the target data and the analytical rule.

12. The method of claim 11, wherein:
acquiring device identification information identifying a device when the target data includes the device identification information identifying a device, and
determining whether that the search rule should be changed.

* * * * *